(12) United States Patent
Ariyavisitakul et al.

(10) Patent No.: US 8,233,557 B2
(45) Date of Patent: Jul. 31, 2012

(54) METHOD AND SYSTEM FOR SUBSPACE BEAMFORMING FOR NEAR CAPACITY MULTIPLE INPUT MULTIPLE OUTPUT (MIMO) PERFORMANCE

(75) Inventors: Sirikiat Ariyavisitakul, Alpharetta, GA (US); Eric Ojard, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 757 days.

(21) Appl. No.: 12/246,206

(22) Filed: Oct. 6, 2008

(65) Prior Publication Data
US 2009/0190691 A1   Jul. 30, 2009

Related U.S. Application Data

(60) Provisional application No. 61/023,732, filed on Jan. 25, 2008, provisional application No. 61/096,405, filed on Sep. 12, 2008.

(51) Int. Cl.
*H04B 7/02* (2006.01)
(52) U.S. Cl. .................................................. 375/267
(58) Field of Classification Search .......... 375/260, 375/267, 285, 295, 299, 340; 370/334, 350, 370/465
See application file for complete search history.

(56) References Cited

U.S. PATENT DOCUMENTS

| | | | | |
|---|---|---|---|---|
| 7,110,378 | B2* | 9/2006 | Onggosanusi et al. | 370/334 |
| 7,684,510 | B2* | 3/2010 | Lee et al. | 375/267 |
| 2006/0068738 | A1* | 3/2006 | Li et al. | 455/277.1 |
| 2008/0056402 | A1* | 3/2008 | Jang et al. | 375/267 |
| 2008/0108314 | A1* | 5/2008 | Mihota | 455/101 |
| 2009/0268835 | A1* | 10/2009 | Imai et al. | 375/267 |

* cited by examiner

*Primary Examiner* — Khanh C Tran
(74) *Attorney, Agent, or Firm* — Sterne, Kessler, Goldstein & Fox PLLC

(57) ABSTRACT

Aspects of a system for subspace beamforming for near capacity MIMO performance may include a MIMO transmitter that computes one or more rotation angle values ($\theta_f$) based on a channel estimate matrix (H). In instances when each rotation angle is computed based on a Euclidean distance criterion, each value $\theta_f$ may also be computed based on a computed Euclidean distance. Alternatively, in instances when each rotation angle is computed based on a bit error rate (BER) criterion, each value $\theta_f$ may also be computed based on a signal noise power level ($N_0$). A plurality of spatial stream signals ($x_i$) may be generated utilizing one or more constellation types. The constellation map for each constellation type may be rotated based on a corresponding value $\theta_f$. A plurality of transmit chain signals ($tx_i$) may be generated based on the signals $x_i$ and transmitted via a communication medium characterized by matrix H.

24 Claims, 36 Drawing Sheets

METHOD AND SYSTEM FOR SUBSPACE BEAMFORMING FOR NEAR CAPACITY MULTIPLE INPUT MULTIPLE OUTPUT (MIMO) PERFORMANCE

CROSS-REFERENCE TO RELATED APPLICATIONS/INCORPORATION BY REFERENCE

This application makes reference, claims priority to, and claims the benefit of U.S. Application Ser. No. 61/023,732 filed Jan. 25, 2008 and U.S. Application Ser. No. 61/096,405 filed Sep. 12, 2008, which is hereby incorporated herein by reference in its entirety.

This application makes reference to U.S. application Ser. No. 11/494,962 filed on Jul. 28, 2006, which is hereby incorporated herein by reference in its entirety.

FIELD OF THE INVENTION

Certain embodiments of the invention relate to wireless communications. More specifically, certain embodiments of the invention relate to a method and system for subspace beamforming for near capacity multiple input multiple output (MIMO) performance.

BACKGROUND OF THE INVENTION

In multiple input multiple output (MIMO) wireless systems, multiple data streams may be transmitted simultaneously using a plurality of transmitting antennas. A MIMO receiver may utilize a plurality of receiving antennas to decouple, and detect individual data streams. Two predominant methods for MIMO transmission include singular value decomposition (SVD), and layered space-time (LST) processing, also known as successive interference cancellation (SIC).

SVD may use beamforming in conjunction with a transmitter antenna array and receiver antenna array to create virtual channels, or eigen-channels, through which multiple data streams may be sent without interfering with one another. LST/SIC may use receiver antennal array processing to detect the multiple data streams, one stream at a time. For each detection "layer," the interference from yet undetected streams may be nulled out, while the interference from already detected streams may be cancelled, or subtracted, out.

The eigen-channels in SVD may have highly unequal signal to noise ratios (SNR), depending on the eigen-spread of the MIMO channel matrix. SVD may also rely upon adaptive modulation, or adaptive bit loading, to achieve greater data transfer rates for eigen-channels associated with higher SNR values, while simultaneously supporting lower data transfer rates for eigen-channels associated with lower SNR values. SVD may also suffer performance loss, by not achieving the peak theoretical data transfer rate aggregated among the eigen-channels when a broad range of modulation types are not available. For example, if a maximum data transfer rate associated with an eigen-channel requires a 1024 QAM modulation type, the maximum data transfer rate may not be achievable if the required modulation type is not available to be utilized.

LST/SIC approaches may suffer performance losses as a result of error propagation. For example, if a current layer is detected in error, the error may propagate to other layers increasing the probability that subsequent layers may also be detected in error. LST/SIC may require stream re-ordering to detect data streams with higher SNR values first to minimize error propagation. Some methods, such as vertical LST (VLST) may provide error protection through coding of each data stream. Based on the coding, decisions may be made subsequent to decoding to subtract out interference.

Alternatively, precoding based on dirty paper theory, for example Tomlinson-Harashima precoding (THP), may be utilized to pre-cancel interference at the transmitter without requiring the signals to be transmitted with greater levels of transmitted radiated power. The THP approach may require channel knowledge at the transmitter.

Geometric mean decomposition (GMD) may be based on beamforming and LST/SIC at a transmitter, by utilizing THP for example, or based on LST/SIC at a receiver, by utilizing VLST for example. SNRs for each of a transmitted plurality of data streams may be about equal when utilizing GMD. Consequently, adaptive bit loading may not be required as may be the case with SVD. GMD may also not require reordering of data streams as may be the case with LST/SIC.

While a combination of GMD beamforming at a MIMO transmitter and VLST at a MIMO receiver may be utilized to achieve desirable performance levels within theoretical limitations, the latency and/or complexity associated with implementation of successive interference cancellation (SIC) methods may impose limitations on the design of MIMO receivers. IEEE 802.11 specifications may comprise requirements for structures utilized for coding data transmitted via a wireless communication channel, and for packet detection delay limits that establish a time duration between a time instant when one or more signals are received by a MIMO receiver, and a subsequent time instant when data transmitted via the one or more signals is detected at the MIMO receiver.

A MIMO transmitter may concurrently transmit a plurality of NTX signals, $x_i$, from a plurality of NTX transmitting antennas. The plurality of transmitted signals ($x_i$) may propagate across a communication medium, which is characterized by a channel estimate matrix (H), and be received at a MIMO receiver as a plurality of NRX signals, ($y_i$) via a plurality of NRX receiving antennas. Each signal $x_i$ may be generated based on data from a corresponding spatial stream or space-time stream. Each of the transmitted signals $x_i$ may comprise a sequence of symbols from the corresponding spatial stream (or space-time stream), each of which represents one or more data bits (the data may be encoded by utilizing an error detection and/or correction coding technique such as binary convolutional coding (BCC)). The number of bits represented by each symbol is determined based on a modulation type. The symbol may be generated by selecting a constellation point within a constellation map. The number of constellation points in the constellation map is also determined based on the constellation map. Typically the number of constellation points in the constellation map is equal to $2^{b(sym)}$, where b(sym) represents the number of bits represented by each symbol. For example, in a 64-QAM (quadrature amplitude modulation) constellation map, there are 64 constellation points, where each constellation point represents a distinct combination of 6 bit values (with binary values ranging from 000000 to 111111). The variable $x_i$ may represent the value of each signal transmitted from the $i^{th}$ transmitting antenna at a given time instant. Each transmitting antenna may utilize a distinct modulation type when transmitting signals $x_i$ or one or more transmitting antenna may utilize the same modulation type. Symbol values $x_i$ transmitted by each transmitting antenna may be determined independently from symbol values concurrently transmitted by other transmitting antennas.

The received signals $y_i$ may also include noise components ($n_i$) which reflects signal noise induced during signal propagation across the communication medium. The relationship between the vector of signals $x_i$ transmitted by the MIMO transmitter (X) and the vector of signals $y_i$ received by the MIMO receiver (Y) may be represented as follows:

$$Y = HX + N \quad [1]$$

The MIMO receiver computes the channel estimate matrix H, either based on preamble information received in conjunction with the received signals $x_i$ or based on information received from the MIMO transmitter. The MIMO receiver then attempts to determine estimated values ($\hat{x}_i$), which likely reflect the values $x_i$ transmitted by the MIMO transmitter. A detector in a MIMO receiver determines the estimated values $\hat{x}_i$ by selecting constellation points from among the $2^{b(sym)}$ constellation points in the constellation map for $x_i$ ($C^M$), which provide the greatest probability that $x_i = \hat{x}_i$. The relationship may be represented as follows:

$$\hat{x}_i = \underset{\hat{x}_i \in C^M}{\mathrm{argmax}} P(\hat{x}_i \text{ is observed} \mid x_i \text{ was sent}) \quad [2]$$

A detector at a MIMO receiver, which determines values $\hat{x}_i$ that satisfy equation [2], is referred to as a maximum likelihood (ML) detector.

The computational complexity of ML detection may grow exponentially with the number of spatial streams (NSS) and may be represented as $$\prod_{i=1}^{NSS} 2^{b(sym_i)},$$

where $$\prod_{i=1}^{NSS} j(i)$$

represents the multiplicative product of values j(i) for values of i from 1 to NSS and $b(sym_i)$ represents the number of bits represented by symbols in the $i^{th}$ spatial stream. Due to computational complexity, it may be impractical to implement ML detection in some conventional systems for values NSS>2 for 64-QAM. Furthermore, the computational task of computing beamforming factors at a MIMO transmitter to be utilized with ML detection at a MIMO receiver may be non-deterministic polynomial-time hard (NP-hard).

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for subspace beamforming for near capacity multiple input multiple output (MIMO) performance, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6I presents a graph of exemplary rotation angle values computed based on a BER criterion as a function of the condition number and SNR=28 dB for 64-QAM, in accordance with an embodiment of the invention.

DETAILED DESCRIPTION OF THE INVENTION

Certain embodiments of the invention relate to a method and system for subspace beamforming for near capacity multiple input multiple output (MIMO) performance. Subspace beamforming enables a MIMO transmitter to generate a vector of beamformed signals ($x_i$) such that received signals ($y_i$) may be processed at a MIMO receiver (using, for example, a filter) to generate signals ($r_i$).

In one aspect of the invention, the beamformed signals ($x_i$) may be generated based on Givens rotation angles ($\theta_f$, where f is an index value), where the rotation angle $\theta_f$ is computed at the MIMO transmitter to maximize the Euclidean distance between the symbol values for signal pairs $x_j$ and $x_k$ (selected from the plurality of signals $x_i$) within a given constellation map. Increasing the Euclidean distance between signal pairs $x_j$ and $x_k$ may increase the data-carrying capacity of RF channels (as measured in transmitted bits per second) in a MIMO communication system by increasing the probability that a ML detector in a MIMO receiver will decode filtered signals $r_i$ and generate estimated symbol values $\hat{x}_j$ and $\hat{x}_j$ such that $\hat{x}_j = x_j$ and $\hat{x}_k = x_k$. The MIMO transmitter may communicate the computed rotation angle $\theta_f$ to the MIMO receiver.

In another aspect of the invention, the rotation angle $\theta_f$ may be computed at the MIMO transmitter to minimize a bit error rate (BER) for signals ($y_i$) received at the MIMO receiver. The rotation angle may be computed as a function of the channel estimate matrix (H), the constellation type selected to generate symbol values for $x_j$ and $x_k$ and based on the noise power of the channel noise ($N_0$). A singular value decomposition method may be utilized to compute a set of eigenvalues ($s_i$) based the matrix H. The ratio of eigenvalues $s_j$ and $s_k$ (which correspond to a pair of signals $x_j$ and $x_k$) may enable computation of a condition number. The eigenvalues $s_j$ and $s_k$ and the noise power value $N_0$ may enable the computation of a signal to noise ratio (SNR). In various embodiments of the invention, the rotation angle $\theta_f$ may be computed as a function of computed condition number and SNR values. The MIMO transmitter may communicate the computed rotation angle $\theta_f$ to the MIMO receiver.

Figure 1:
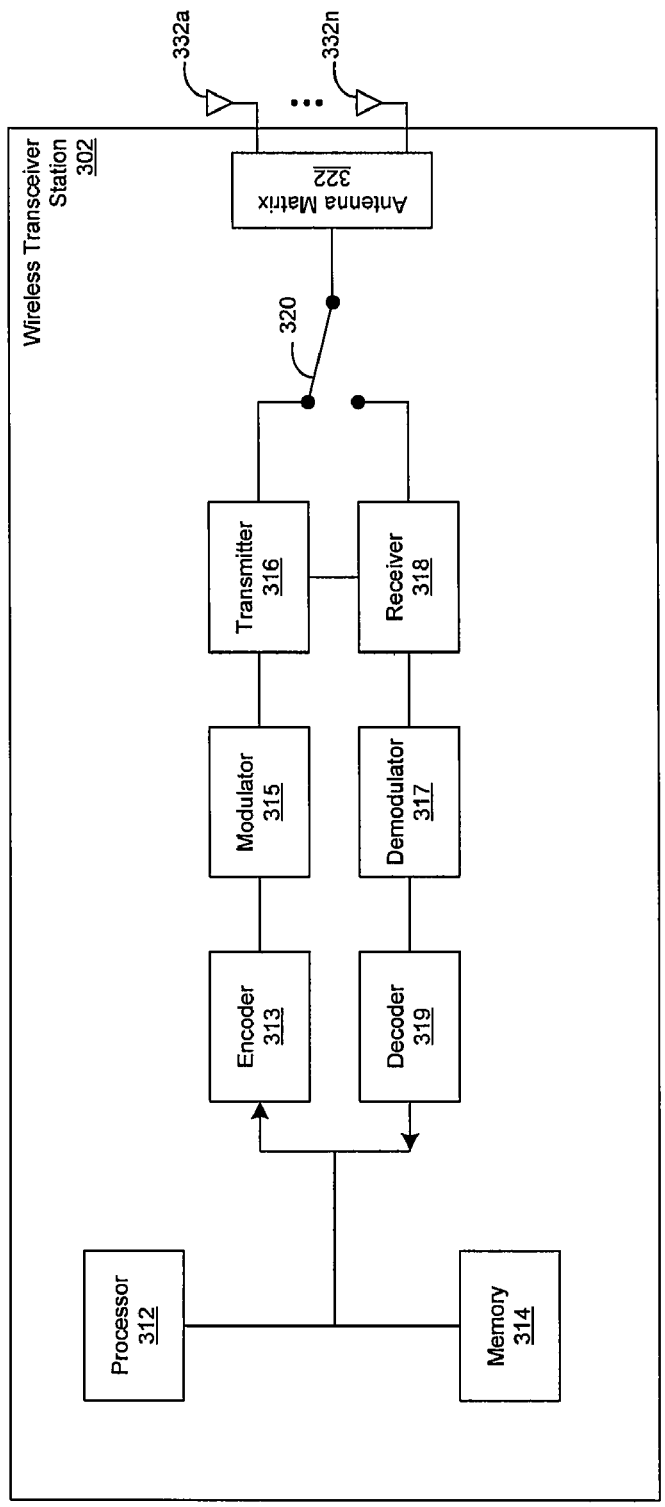
FIG. 1 is a diagram illustrating an exemplary MIMO transceiver system, which may be utilized in connection with an embodiment of the invention.

FIG. 1 is a diagram illustrating an exemplary MIMO transceiver system, which may be utilized in connection with an embodiment of the invention. Referring to FIG. 1, there is shown a wireless transceiver station 302 and a plurality of antennas 332a . . . 332n. The wireless transceiver station 302 is an exemplary wireless communication device, which may be utilized as a MIMO transmitter and/or MIMO receiver. The plurality of antennas 332a . . . 332n may enable the wireless transceiver station 302 to transmit and/or receive signals, for example radio frequency (RF) signals, via a wireless communication medium. The wireless transceiver station 302 shown in FIG. 1 may also be depicted as comprising one or more transmitting antennas, which are coupled to the transmitter 316 and one or more receiving antennas, which may be coupled to the receiver 318 without loss of generality.

The exemplary wireless transceiver station 302 comprises a processor 312, a memory 314, an encoder 313 a modulator 315 a transmitter 316, a demodulator 317, a decoder 319, a receiver 318, a transmit and receive (T/R) switch 320 and an antenna matrix 322. The antenna matrix 322 may enable selection of one or more of the antennas 332a . . . 332n for transmitting and/or receiving signals at the wireless transceiver station 302. The T/R switch 320 may enable the antenna matrix 322 to be communicatively coupled to the transmitter 316 or receiver 318.

The transmitter 316 may enable the generation of signals, which may be transmitted via the selected antennas 332a . . . 332n. The encoder 313 may receive uncoded (or raw) data from the processor and/or memory and encode the data (for example, using binary convolutional coding (bcc)). The modulator 315 may receive encoded data from the encoder 313 and convert binary data to a data symbol representation based on one or more selected modulation types. The modulator 315 may generate one or more spatial streams to transmit the data symbols to the transmitter 316.

The receiver 318 may enable the processing of signals received via the selected antennas 332a . . . 332n. The demodulator 317 may receive data symbols from the receiver 318 and generate a binary representation of the received symbols based on one or more selected modulation types. The binary data may be sent to a decoder 319, which may decode the binary data to generate uncoded data. The uncoded binary data may be sent from the decoder 319 to the processor 312 and/or memory 314.

Figure 2:
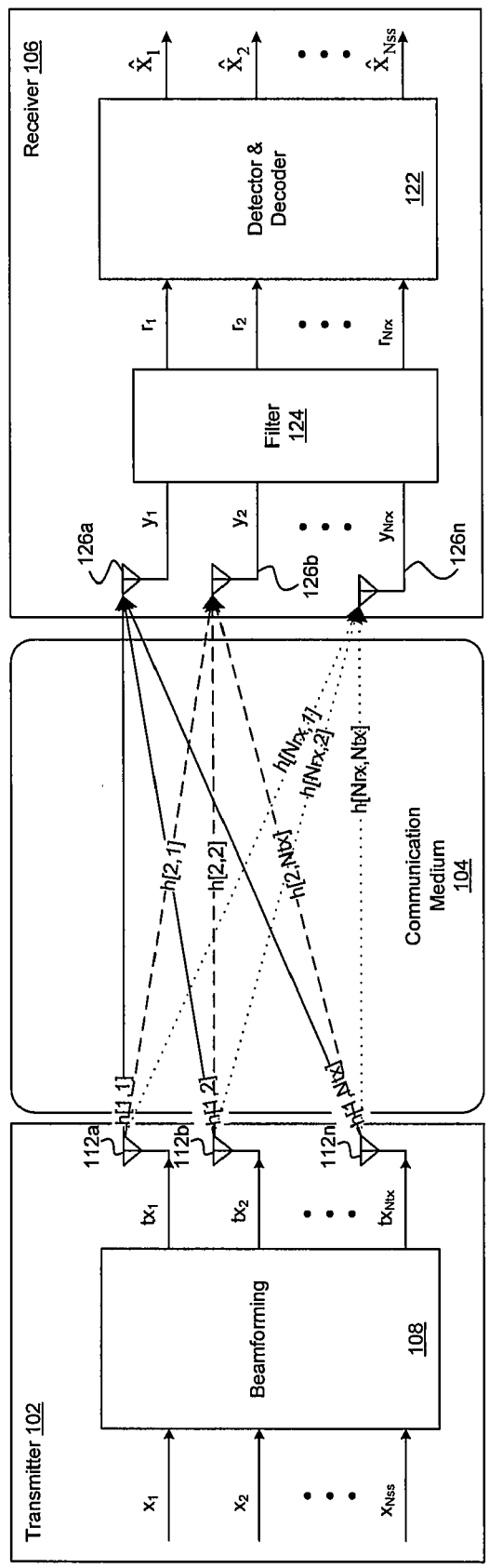
FIG. 2 is a diagram illustrating an exemplary MIMO communication system, in accordance with an embodiment of the invention.

FIG. 2 is a diagram illustrating an exemplary MIMO communication system, in accordance with an embodiment of the invention. Referring to FIG. 2, there is shown a MIMO transmitter 102, a MIMO receiver 106, and a communications medium 104. The communications medium 104 may represent a wireless communications medium, for example. The MIMO transmitter 102 may comprise a beamforming block 108 and a plurality of antennas 112a, 112b, . . . , and 112n. The MIMO receiver 106 may comprise a plurality of antennas 126a, 126b, . . . , and 126n, a filter block 124 and a detector and decoder block 122.

The beamforming block 108 may receive a plurality of Nss spatial streams, $x_1, x_2, \ldots$, and $x_{Nss}$ and output a plurality of Ntx transmit chain signals $tx_1, tx_2, \ldots$, and $tx_{Ntx}$. Each of the spatial streams may be generated by a modulator block 315 shown in FIG. 1, which is commonly present in transmitter and/or transceiver systems. Such circuitry may include, for example, parsing circuitry, which distributes bits from a single input bit stream among the plurality of spatial streams, and modulator 315 circuitry, which utilizes a constellation associated with a modulation type to convert groups of bits within a given spatial stream into one of a plurality of signal levels. Each of the transmit chain signals may be generated by computing a weighted sum from the plurality of spatial streams, where the weights may be determined by the beamforming block 108. A time domain version of the signals $tx_1, tx_2, \ldots$, and $tx_{Ntx}$ may be transmitted by a corresponding one of antennas 110a, 110b, . . . , and 110n. The transmitted signals may be represented by a column vector $X_T$.

The antennas 126a, 126b, . . . , and 126n may receive signals, $y_1, t_2, \ldots$, and $y_{Nrx}$, respectively, which propagate via the communication medium 104. The transmitted signal vector $X_T$ may be altered as it propagates through the communication medium 104. The altered signals may be received at the MIMO receiver as a received signal vector Y. The alteration of the transmitted signals may be represented by channel estimates h[i,j]. As shown in FIG. 2, the signal $tx_1$ which is transmitted by antenna 112a and received at antenna 126a may be altered based on a channel estimate h[1,1]. The signal, $tx_2$, which is transmitted by antenna 112b and received at antenna 126a may be altered based on a channel estimate h[1,2]. The signal, $tx_{Ntx}$, which is transmitted by antenna 112n and received at antenna 126a may be altered based on a channel estimate h[1,Ntx].

The signal, $tx_1$, which is transmitted by antenna 112a and received at antenna 126b may be altered based on a channel estimate h[2,1]. The signal, $tx_2$, which is transmitted by antenna 112b and received at antenna 126b may be altered based on a channel estimate h[2,2]. The signal, $tx_{Ntx}$, which is transmitted by antenna 112n and received at antenna 126b may be altered based on a channel estimate h[2,Ntx].

The signal $tx_1$ which is transmitted by antenna 112a and received at antenna 126n may be altered based on a channel estimate h[Nrx,1]. The signal $tx_2$ which is transmitted by antenna 112b and received at antenna 126n may be altered based on a channel estimate h[Nrx,2]. The signal $tx_{Ntx}$ which is transmitted by antenna 112n and received at antenna 126n may be altered based on a channel estimate h[Nrx,Ntx].

At the MIMO receiver 106, a plurality of signals, $y_1, y_2, \ldots$, and $y_{Nrx}$, may be received by antennas 126a, 126b, . . . , and 126n. The signals received at each antenna may be represented by the following system of equations:

$$y_1 = h[1,1] \cdot tx_1 + h[1,2] \cdot tx_2 + \ldots + h[1,Ntx] \cdot tx_{Ntx} + n_1$$

$$y_2 = h[2,1] \cdot tx_1 + h[2,2] \cdot tx_2 + \ldots + h[2,Ntx] \cdot tx_{Ntx} + n_2$$

$$\ldots$$

$$y_{Ntx} = h[Nrx,1] \cdot tx_1 + h[Nrx,2] \cdot tx_2 + \ldots + h[Nrx,Ntx] \cdot tx_{Ntx} + n_{Nrx} \quad [3]$$

The received signals may be represented by a column vector Y.

The filter block 124 may process the received signals $y_1, y_2, \ldots$, and $y_{Nrx}$ and generate filtered signals $r_1, r_2, \ldots$, and $r_{Nrx}$. The decoder block may enable the MIMO receiver 106 to generate a plurality of estimated signal values $\hat{x}_1, \hat{x}_2$, and $\hat{x}_{Nss}$ based on the filtered signals $r_1, r_2, \ldots$, and $r_{Nrx}$. Each of the estimated symbol values $\hat{x}_i$ may be represented by one or more bits $b_1, b_2, \ldots$, and $b_{sym(i)}$, wherein each binary bit value may be determined by the detector and decoder block 122.

The decoder 106 may comprise functionality not shown in FIG. 2, which is commonly present in receiver and/or transceiver systems. Such circuitry may include, for example, equalizer circuitry, which adjusts signal levels for received signals based on the plurality of channel estimate values h[i,j], demodulator 317 circuitry, which utilizes a constellation associated with a modulation type to convert signal levels into one or more bit values, and interleaver circuitry, which merges bits from a plurality of spatial streams and/or received RF chains, into a single bit stream.

In various embodiments of the invention, the transmitter 102 shown in FIG. 2 may be a component in a transceiver station (such as shown in FIG. 1). The receiver portion of the transceiver may enable the reception of signals (from the receiver 106 shown in FIG. 2) from which a channel estimate matrix (H) may be computed. The beamforming block 108 may utilize coefficient values h[i,j] from the channel estimate matrix when generating the signals $tx_1, tx_2, \ldots$, and $tx_{Ntx}$.

The receiver 106 shown in FIG. 2 may also be a component in a transceiver station. The receiver 106 may enable the reception of signals $y_1, y_2, \ldots$, and $y_{Nrx}$ from which a channel estimate matrix (H) may be computed. The filter 124 and detector and decoder block 122 may utilize the channel estimate matrix when processing received signals $y_1, y_2, \ldots$, and $y_{Nrx}$ and/or filtered signals $r_1, r_2, \ldots$, and $r_{Nrx}$. The transmitter portion of the transceiver station may enable transmission of signals (to the transmitter 102 shown in FIG. 2).

In various embodiments of the invention, an SVD representation of the channel estimate matrix may be generated as follows:

$$H = U S V_1^H \quad [4]$$

where S is a diagonal singular matrix of eigenvalues of H, U a matrix of "output" basis vectors of H and $V_1$ is a matrix of "input" basis vectors of H. $V_1^H$ represents a complex conjugate transform version of the matrix $V_1$. In an exemplary 4×4 MIMO communication system, in which Ntx=4 at the MIMO transmitter and Nrx=4 at the MIMO receiver, the matrix S may comprise a set of four (4) eigenvalues: $s_1$, $s_2$, $s_3$ and $s_4$ (where $s_i \geq s_j$ for i<j). An eigenvalue $s_i$ may be located at the $i^{th}$ row in the matrix S.

In various embodiments of the invention, the eigenvalues may be rearranged in the matrix S such that eigenvalues $s_1$ and $s_4$ are located at adjacent rows in the matrix S and $s_2$ and $s_3$ located at adjacent rows in S. The rearranged matrix may be referred to as $S_R$. Furthermore, the matrix $S_R$ may be represented as a block diagonal matrix, which comprises two (2) matrices $s_1$ and $s_2$ as shown below:

$$S_R = \begin{bmatrix} S_1 & 0 \\ 0 & S_2 \end{bmatrix} \quad [5]$$

where:

$$S_1 = \begin{bmatrix} s_1 & 0 \\ 0 & s_4 \end{bmatrix} \quad [6a]$$

$$S_2 = \begin{bmatrix} s_2 & 0 \\ 0 & s_3 \end{bmatrix} \quad [6b]$$

In various embodiments of the invention, a beamforming block 108 may generate transmitted signals $tx_1, tx_2, \ldots$, and $tx_{Ntx}$ by utilizing Givens rotation. Givens rotation enables rotation of the constellation maps utilized for generating symbol values $x_1, x_2, \ldots$, and $x_{Nss}$. In various embodiments of the invention, one or more rotation angles ($\theta_f$) may be computed at a MIMO transmitter that increase the probability that $x_i = \hat{x}_i$ at a MIMO receiver.

In an exemplary embodiment of the invention, the beamforming block 108 may generate transmitted signals ($tx_i$) based on spatial stream signals ($x_i$) as shown below:

$$X_T = V_1 G(\theta) X \quad [7]$$

where $X_T$ represents the vector of transmitted signals $tx_i$, X represents the vector of spatial stream signals $x_i$ and $G(\theta)$ represents a Givens rotation matrix. The Givens rotation matrix is defined as a function of the rotation angle $\theta$. The signal vector received signal vector at the MIMO receiver may be represented as follows:

$$Y = H X_T + N \quad [8]$$

Using the definition of $X_T$ from equation [7], equation [8] may be represented as follows:

$$Y = H V_1 G(\theta) X + N \quad [9]$$

Using an SVD representation of H, equation [9] may be represented as follows:

$$Y = U S_R V_1^H V_1 G(\theta) X + N \quad [10]$$

where $S_R$ represents a rotated version of S (as presented in equation [5]). Based on the unitary property of $V_1$, $V_1^H = V_1^{-1}$. Consequently, equation [10] may be represented as follows:

$$Y = U S_R G(\theta) X + N \quad [11]$$

The MIMO receiver may utilize the filter block 124 to filter the received signal vector Y. The filtered signal vector (R) may be represented as follows:

$$R = U^H Y = U^H U S_R G(\theta) X + U^H N \quad [12]$$

where the filtering function of the filter block 124 may be represented by the matrix $U^H$. Based on the unitary property of H, equation [12] may be represented as follows:

$$R = S_R G(\theta) X + U_H N \quad [13]$$

The matrix $G(\theta)$ can be represented as a block diagonal matrix as follows:

$$G(\theta) = \begin{bmatrix} G(\theta_1) & 0 \\ 0 & G(\theta_2) \end{bmatrix} \quad [14]$$

where:

$$G(\theta_1) = \begin{bmatrix} \cos(\theta_1) & -\sin(\theta_1) \\ \sin(\theta_1) & \cos(\theta_1) \end{bmatrix} \quad [15a]$$

$$G(\theta_2) = \begin{bmatrix} \cos(\theta_2) & -\sin(\theta_2) \\ \sin(\theta_2) & \cos(\theta_2) \end{bmatrix} \quad [15b]$$

Based on equations [6] and [14], equation [13] may be represented as follows:

$$\begin{bmatrix} r_1 \\ r_2 \\ r_3 \\ r_4 \end{bmatrix} = \begin{bmatrix} S_1 G(\theta_1) & 0 \\ 0 & S_2 G(\theta_2) \end{bmatrix} \begin{bmatrix} x_1 \\ x_2 \\ x_3 \\ x_4 \end{bmatrix} + U^H N \quad [16]$$

$$\begin{bmatrix} r_1 \\ r_2 \\ r_3 \\ r_4 \end{bmatrix} = \begin{bmatrix} S_1 G(\theta_1) & 0 \\ 0 & S_2 G(\theta_2) \end{bmatrix} \begin{bmatrix} x_1 \\ x_2 \\ x_3 \\ x_4 \end{bmatrix} + \tilde{N} \quad [17]$$

$$\begin{bmatrix} r_1 \\ r_2 \\ r_3 \\ r_4 \end{bmatrix} = \begin{bmatrix} S_1 G(\theta_1) \begin{bmatrix} x_1 \\ x_2 \end{bmatrix} \\ S_2 G(\theta_2) \begin{bmatrix} x_3 \\ x_4 \end{bmatrix} \end{bmatrix} + \tilde{N} \quad [18]$$

In one aspect of the invention, the rotation angle $\theta_f$ may be computed such to maximize the minimum Euclidean distance between pairs of symbol values $x_j$ and $x_k$ as represented in the following equation:

$$\max_{\theta_f} \min d(x_j, x_k) \quad [19]$$

Based on equation [18], rotation angles $\theta_1$ and $\theta_2$ may be computed as represented in the following equations:

$$\theta_1 = \max \min \| S_1 G(\theta_1)(x_1 - x_2) \| \quad [20a]$$

$$\theta_2 = \max \min \| S_2 G(\theta_2)(x_3 - x_4) \| \quad [20b]$$

where $\|X\|$ represents the Frobenius norm of X.

The rotation angle $\theta_f$ as represented in equations [20a] and [20b] may be computed as a function of the eigenvalues $s_i$ in the matrix $S_i$. The eigenvalues $s_i$ may be determined based on the channel estimate matrix H. In this regard, the rotation angle $\theta_f$ may be computed as a function of H. The computed value of the rotation angle $\theta_f$ may also be influenced by the constellation size. For example, increasing the constellation size typically results in each constellation point being closer to adjacent constellation points. The changing proximity of constellation points in the constellation maps of different modulation types may result in adjustments to the computed rotation angle $\theta_f$ as computed in equations [20a] and [20b].

In another aspect of the invention, the rotation angle may be computed to minimize the uncoded BER for uncoded bits represented by pairs of symbol values $x_j$ and $x_k$. The rotation angle $\theta_f$ may be computed as a function of a condition number for matrix $S_f$ and an $SNR_f$. Rotation angles $\theta_1$ and $\theta_2$ may be computed as represented in the following equations:

$$\theta_1 = \min_{BER} \theta_1 \left( \frac{s_1}{s_4}, \frac{s_1^2 + s_4^2}{N_0} \right) \quad [21a]$$

$$\theta_2 = \min_{BER} \theta_2 \left( \frac{s_2}{s_3}, \frac{s_2^2 + s_3^2}{N_0} \right) \quad [21b]$$

where the condition number is represented by the ratio of eigenvalues $$\frac{s_j}{s_k}$$

and the SNR is represented by the ratio $$\frac{s_j^2 + s_k^2}{N_0}$$

and $N_0$ represents noise power for channel noise (represented by the vector N in equation [16]). The eigenvalues $s_i$ may be determined based on the channel estimate matrix H. In this regard, the rotation angle $\theta_f$ is computed as a function of H.

The value for the rotation angle $\theta_f$ computed in equations [21a] and [21b] may also be influenced by the constellation size of the modulation type utilized for generating symbol values $x_j$ and $x_k$. For example, increasing constellation size typically corresponds to an increasing number of uncoded bits that are represented in each symbol, which in turn may increase the BER. Consequently, the value of the rotation angle $\theta_f$ may be adjusted to minimize the expected BER at the MIMO receiver.

In various embodiments of the invention, rotation angle values may be computed by a processor 312 for a range of condition number values and/or modulation types and stored as lookup tables (LUT) in memory 314.

Figure 3:
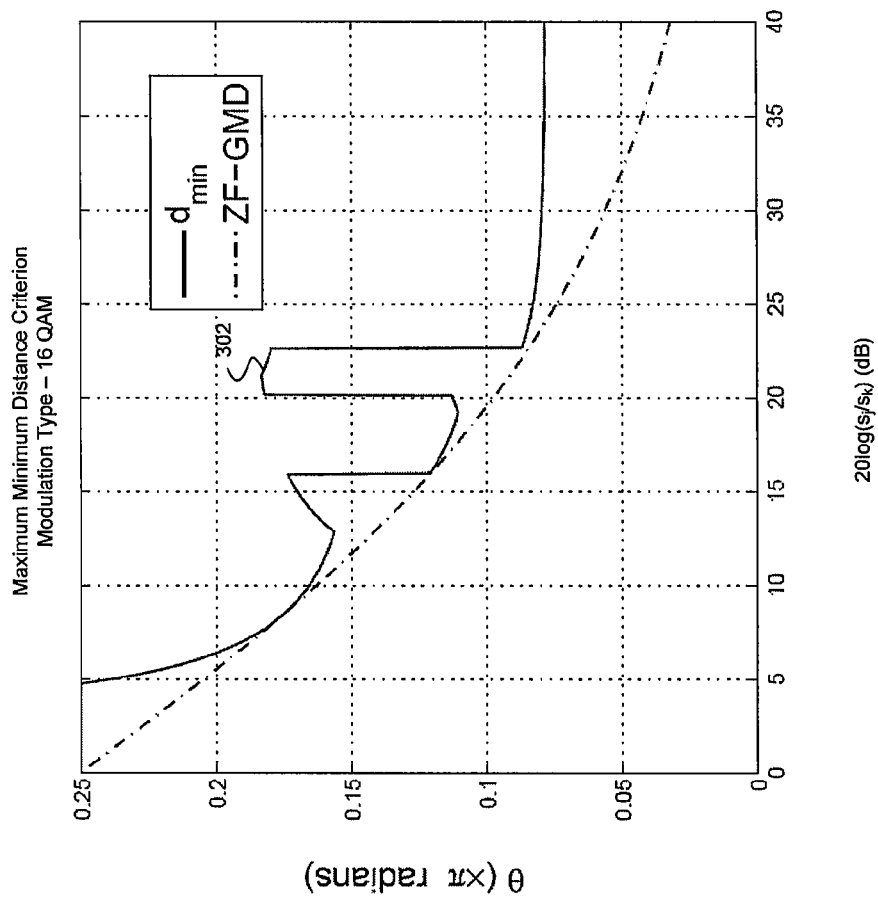
FIG. 3 is a graph that shows exemplary rotation angle values computed based on a Euclidean distance criterion as a function of the condition number, in accordance with an embodiment of the invention.

FIG. 3 shows rotation angle values computed as shown in equations [20] as a function of the condition number. FIG. 3 presents rotation angle values, represented in units of π radians (or 180 degrees), along the vertical axis and a logarithmic representation of the condition number value, represented in units of decibels (dB) along the horizontal axis. The graph 302 presents rotation angle values computed as a function of condition number for a 16 QAM modulation type. The values (θ) shown in graph 302 represent rotation angle values for which the minimum distance between received vectors $x_j$ and $x_k$ may be maximized for 16 QAM based on the ratio of eigenvalues $s_j$ and $s_k$, for an exemplary MIMO communication system. The rotation angle values from graph 302 may be stored in an LUT. For example, when $20 \log(s_1/s_4)=10$, a value $\theta_1 \cong 0.17\pi$ radians, or about 30 degrees, may be retrieved from an LUT.

FIGS. 4A-4J present a series of graphs of rotation angle values computed as shown in equations [21], as a function of the condition number, for a range of SNR values and for a modulation type 4-QAM. FIGS. 4A-4J present rotation angle values, represented in units of degrees, along the vertical axis and a logarithmic representation of the condition number value, represented in units of decibels (dB), along the horizontal axis. The graphs shown in FIGS. 4A-4J present rotation angle values computed as a function of condition number and SNR for a 4-QAM modulation type. The values (θ) shown in the graphs in FIGS. 4A-4J represent rotation angle values for which the uncoded bit BER may be minimized for 4-QAM based on the condition number (which is computed in equations [21] based on the ratio of eigenvalues $s_j$ and $s_k$) and the SNR (which is computed in equations [21] based on the ratio of the sum of squares of eigenvalues $s_j$ and $s_k$ and the channel noise power $N_0$). A set of rotation angle values across a range of condition number values may be sorted by SNR value and stored in an LUT. A rotation angle value $\theta_f$ may be retrieved from the LUT based on the SNR and the condition number.

Figure 4A:
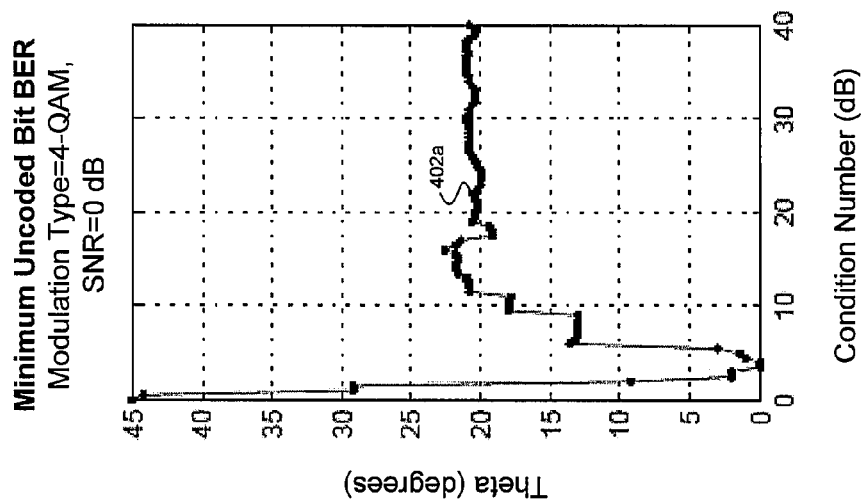
FIG. 4A presents a graph of exemplary rotation angle values computed based on a BER criterion as a function of the condition number and SNR=0 dB for 4-QAM, in accordance with an embodiment of the invention.
Figure 4B:
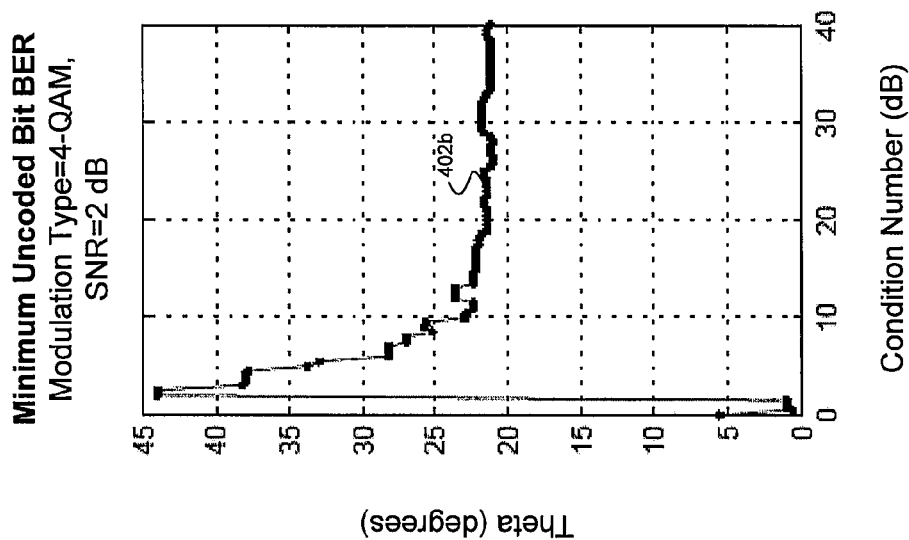
FIG. 4B presents a graph of exemplary rotation angle values computed based on a BER criterion as a function of the condition number and SNR=2 dB for 4-QAM, in accordance with an embodiment of the invention.
Figure 4C:
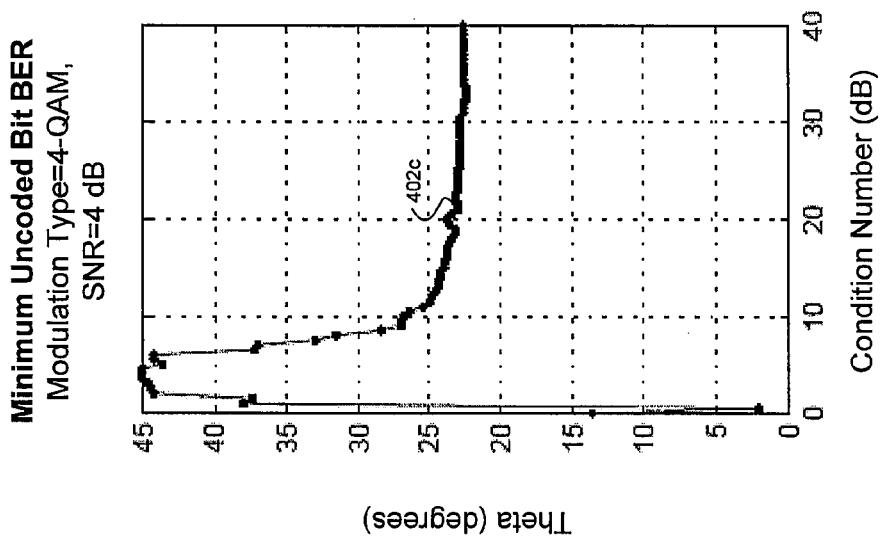
FIG. 4C presents a graph of exemplary rotation angle values computed based on a BER criterion as a function of the condition number and SNR=4 dB for 4-QAM, in accordance with an embodiment of the invention.
Figure 4D:
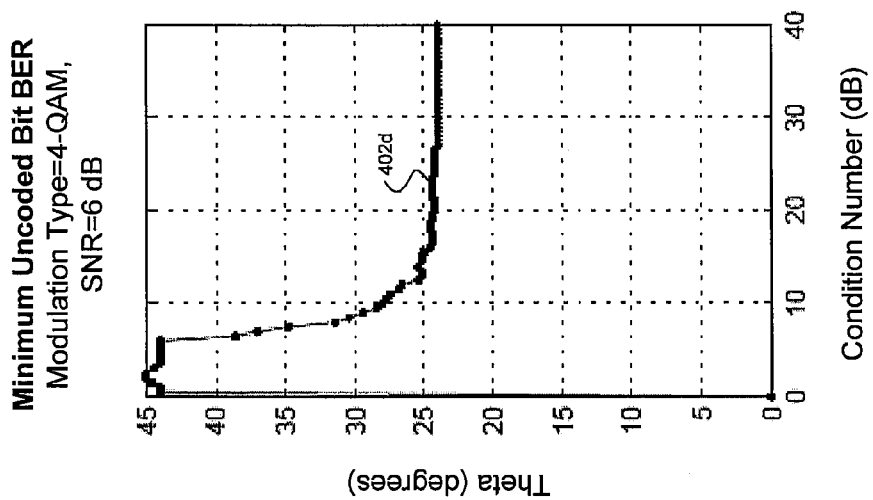
FIG. 4D presents a graph of exemplary rotation angle values computed based on a BER criterion as a function of the condition number and SNR=6 dB for 4-QAM, in accordance with an embodiment of the invention.
Figure 4E:
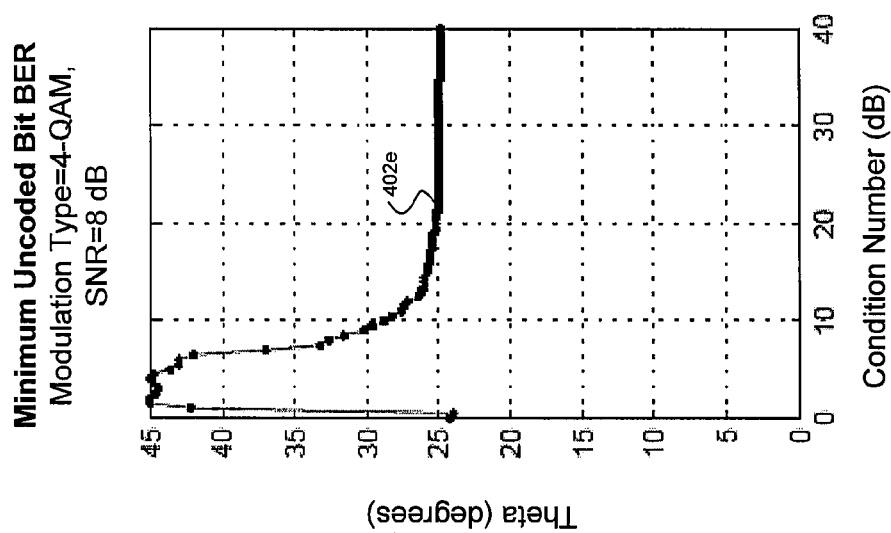
FIG. 4E presents a graph of exemplary rotation angle values computed based on a BER criterion as a function of the condition number and SNR=8 dB for 4-QAM, in accordance with an embodiment of the invention.
Figure 4F:
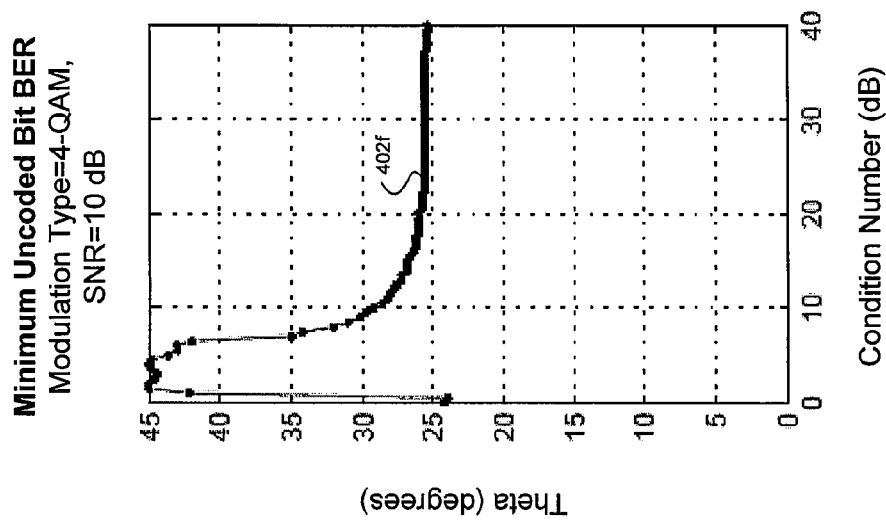
FIG. 4F presents a graph of exemplary rotation angle values computed based on a BER criterion as a function of the condition number and SNR=10 dB for 4-QAM, in accordance with an embodiment of the invention.
Figure 4G:
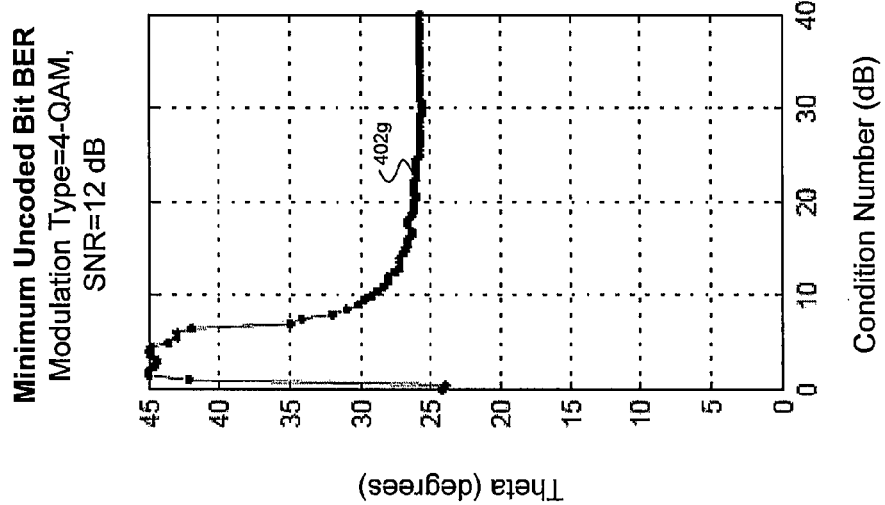
FIG. 4G presents a graph of exemplary rotation angle values computed based on a BER criterion as a function of the condition number and SNR=12 dB for 4-QAM, in accordance with an embodiment of the invention.
Figure 4H:
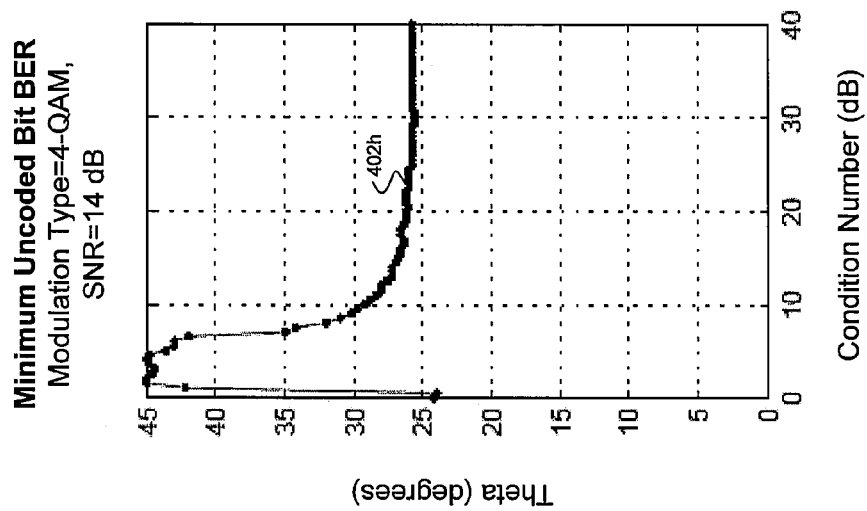
FIG. 4H presents a graph of exemplary rotation angle values computed based on a BER criterion as a function of the condition number and SNR=14 dB for 4-QAM, in accordance with an embodiment of the invention.
Figure 4I:
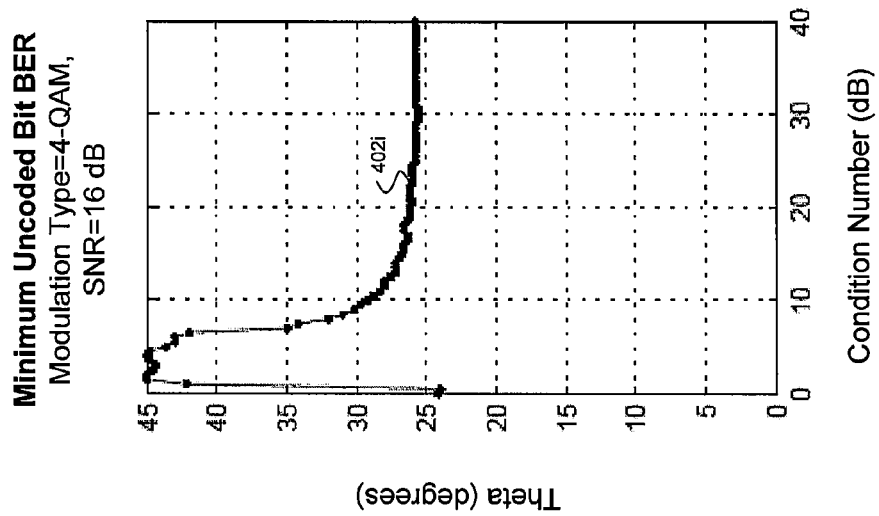
FIG. 4I presents a graph of exemplary rotation angle values computed based on a BER criterion as a function of the condition number and SNR=16 dB for 4-QAM, in accordance with an embodiment of the invention.
Figure 4J:
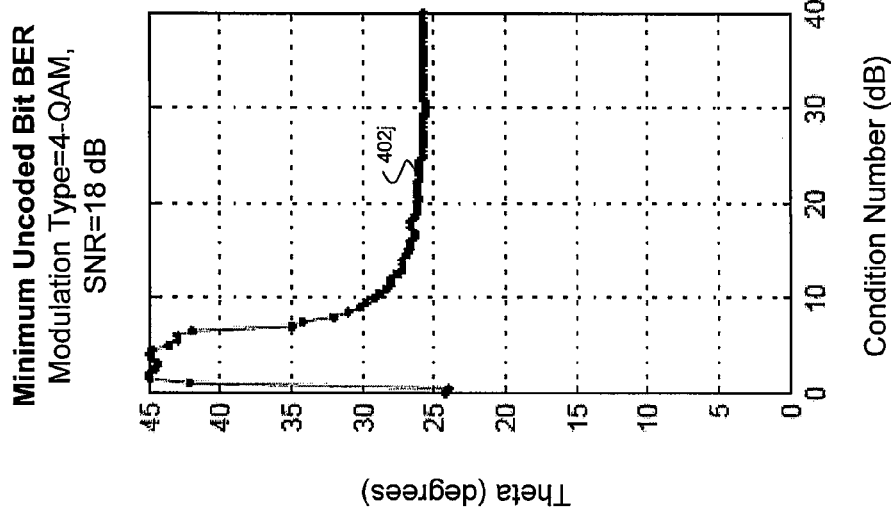
FIG. 4J presents a graph of exemplary rotation angle values computed based on a BER criterion as a function of the condition number and SNR=18 dB for 4-QAM, in accordance with an embodiment of the invention.

FIG. 4A presents a graph 402a of exemplary rotation angle values computed based on a BER criterion as a function of the condition number and SNR=0 dB for 4-QAM, in accordance with an embodiment of the invention. FIG. 4B presents a graph 402b of exemplary rotation angle values computed based on a BER criterion as a function of the condition number and SNR=2 dB for 4-QAM, in accordance with an embodiment of the invention. FIG. 4C presents a graph 402c of exemplary rotation angle values computed based on a BER criterion as a function of the condition number and SNR=4 dB for 4-QAM, in accordance with an embodiment of the invention. FIG. 4D presents a graph 402d of exemplary rotation angle values computed based on a BER criterion as a function of the condition number and SNR=6 dB for 4-QAM, in accordance with an embodiment of the invention. FIG. 4E presents a graph 402e of exemplary rotation angle values computed based on a BER criterion as a function of the condition number and SNR=8 dB for 4-QAM, in accordance with an embodiment of the invention. FIG. 4F presents a graph 402f of exemplary rotation angle values computed based on a BER criterion as a function of the condition number and SNR=10 dB for 4-QAM, in accordance with an embodiment of the invention. FIG. 4G presents a graph 402g of exemplary rotation angle values computed based on a BER criterion as a function of the condition number and SNR=12 dB for 4-QAM, in accordance with an embodiment of the invention. FIG. 4H presents a graph 402h of exemplary rotation angle values computed based on a BER criterion as a function of the condition number and SNR=14 dB for 4-QAM, in accordance with an embodiment of the invention. FIG. 4I presents a graph 402i of exemplary rotation angle values computed based on a BER criterion as a function of the condition number and SNR=16 dB for 4-QAM, in accordance with an embodiment of the invention. FIG. 4J presents a graph 402j of exemplary rotation angle values computed based on a BER criterion as a function of the condition number and SNR=18 dB for 4-QAM, in accordance with an embodiment of the invention.

Figure 5A:
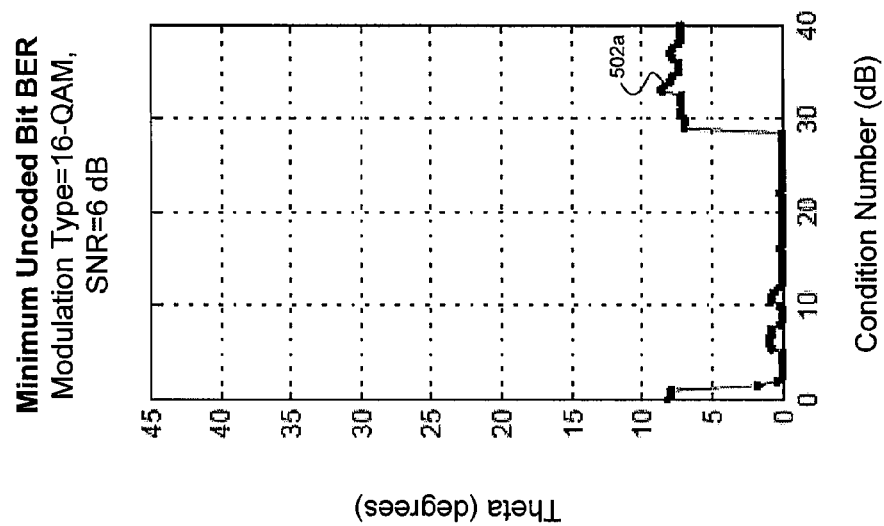
FIG. 5A presents a graph of exemplary rotation angle values computed based on a BER criterion as a function of the condition number and SNR=6 dB for 16-QAM, in accordance with an embodiment of the invention.
Figure 5B:
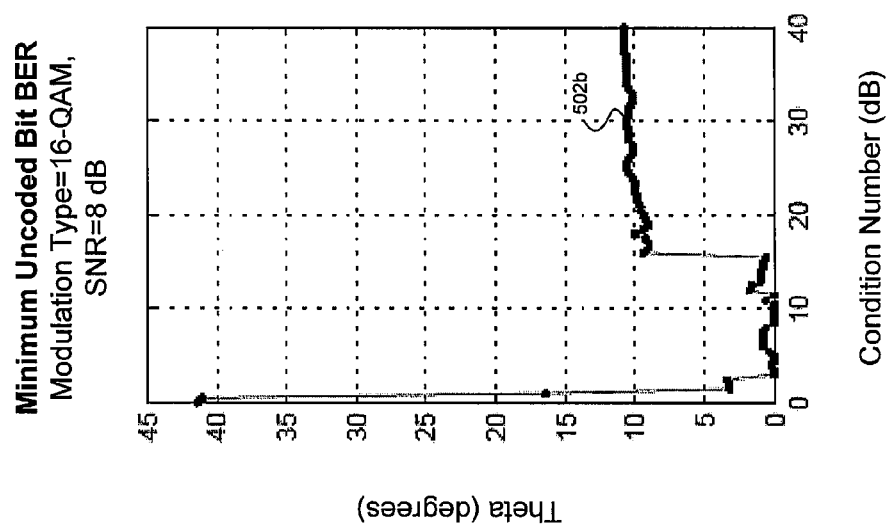
FIG. 5B presents a graph of exemplary rotation angle values computed based on a BER criterion as a function of the condition number and SNR=8 dB for 16-QAM, in accordance with an embodiment of the invention.
Figure 5C:
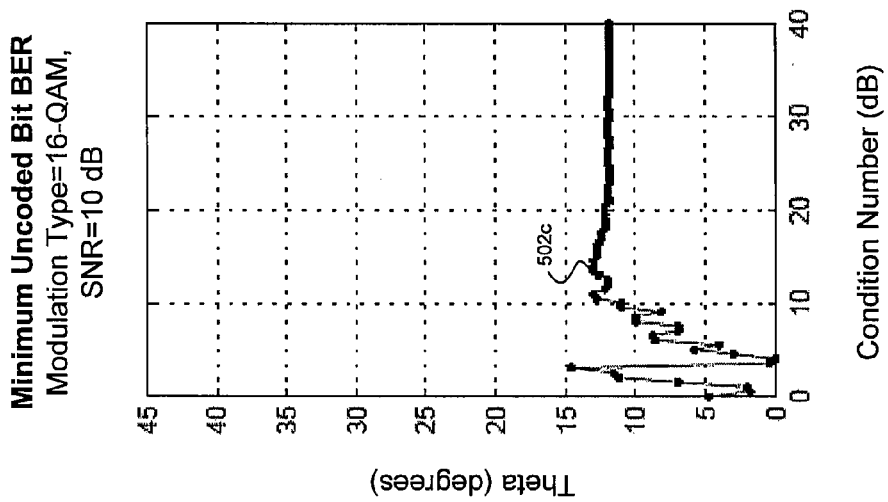
FIG. 5C presents a graph of exemplary rotation angle values computed based on a BER criterion as a function of the condition number and SNR=10 dB for 16-QAM, in accordance with an embodiment of the invention.
Figure 5D:
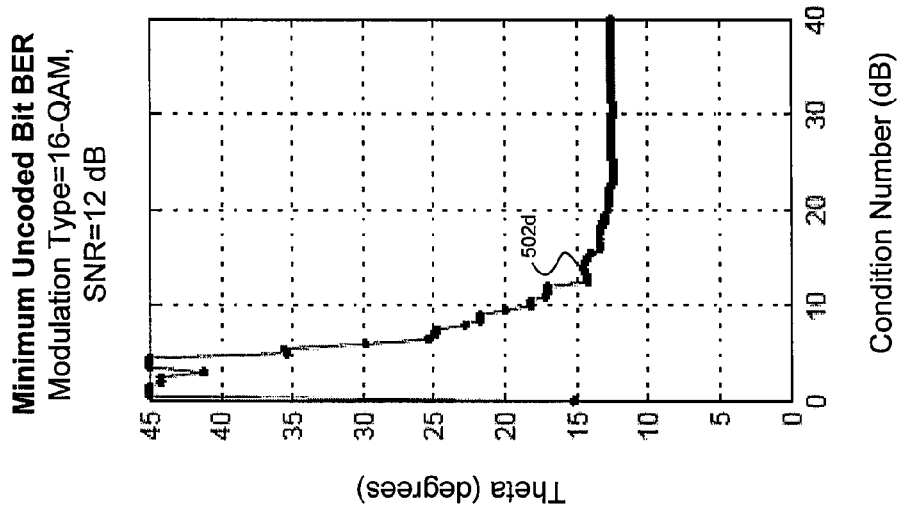
FIG. 5D presents a graph of exemplary rotation angle values computed based on a BER criterion as a function of the condition number and SNR=12 dB for 16-QAM, in accordance with an embodiment of the invention.
Figure 5E:
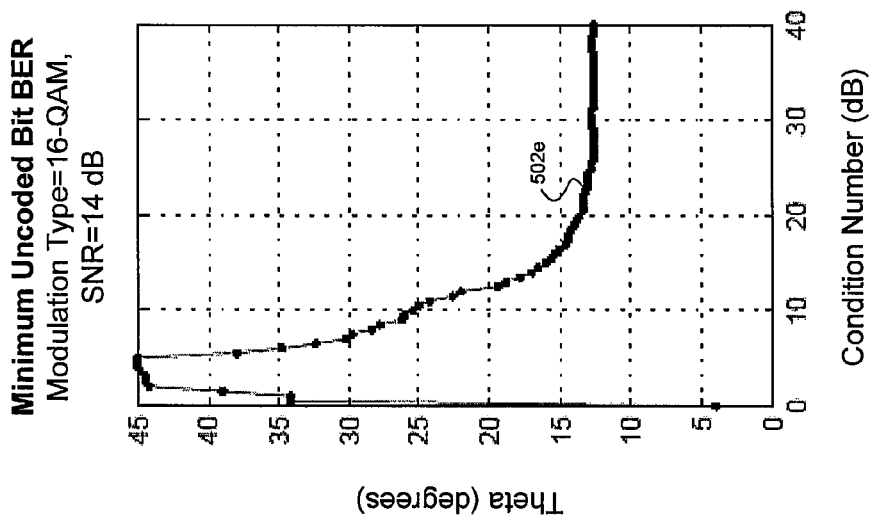
FIG. 5E presents a graph of exemplary rotation angle values computed based on a BER criterion as a function of the condition number and SNR=14 dB for 16-QAM, in accordance with an embodiment of the invention.
Figure 5F:
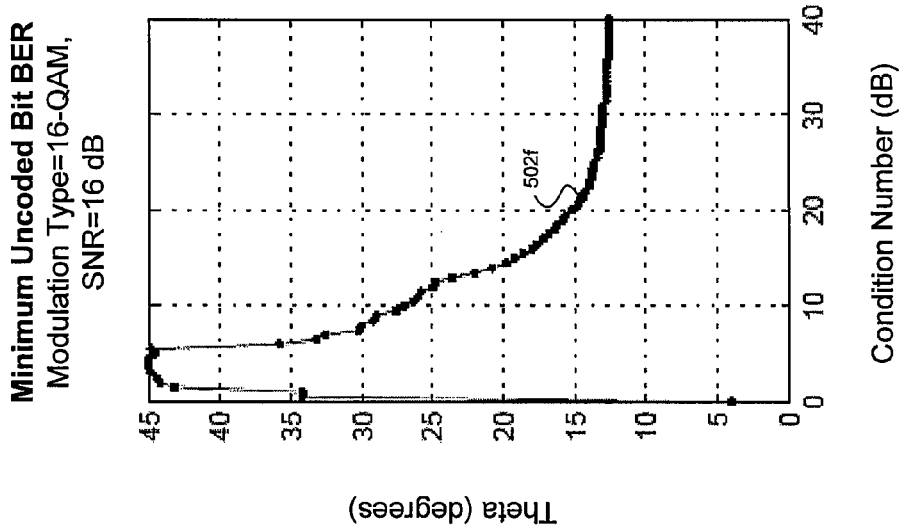
FIG. 5F presents a graph of exemplary rotation angle values computed based on a BER criterion as a function of the condition number and SNR=16 dB for 16-QAM, in accordance with an embodiment of the invention.
Figure 5G:
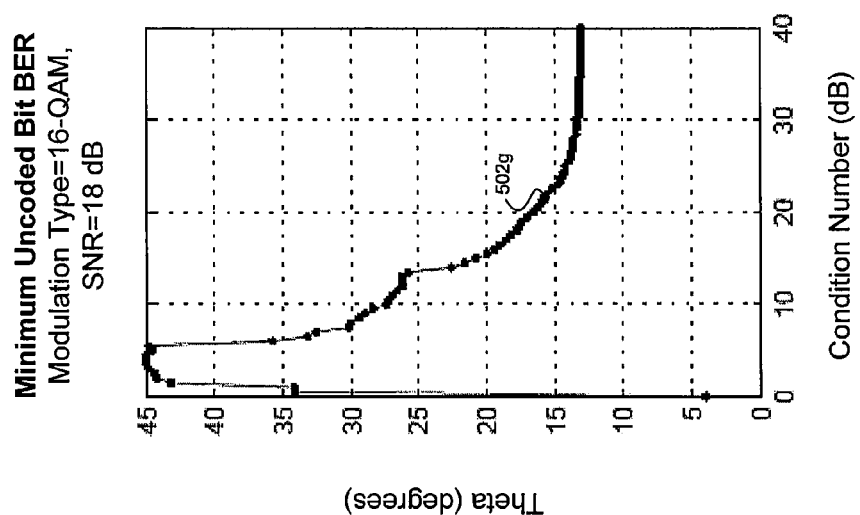
FIG. 5G presents a graph of exemplary rotation angle values computed based on a BER criterion as a function of the condition number and SNR=18 dB for 16-QAM, in accordance with an embodiment of the invention.
Figure 5H:
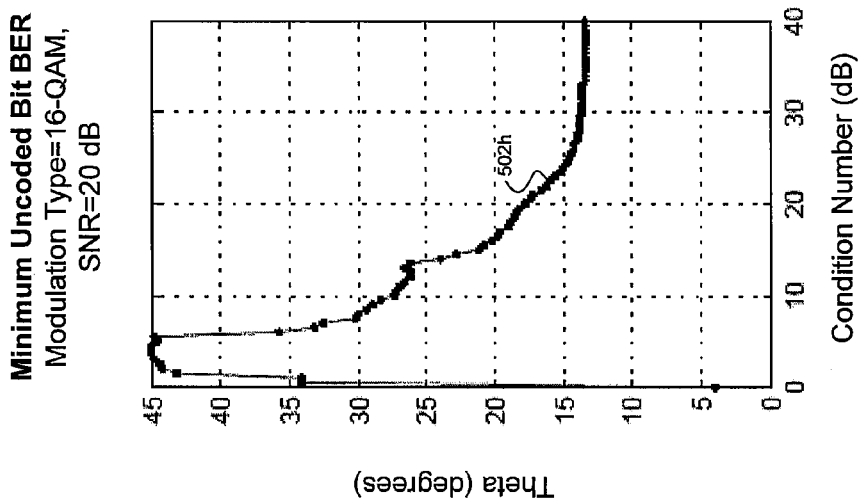
FIG. 5H presents a graph of exemplary rotation angle values computed based on a BER criterion as a function of the condition number and SNR=20 dB for 16-QAM, in accordance with an embodiment of the invention.
Figure 5I:
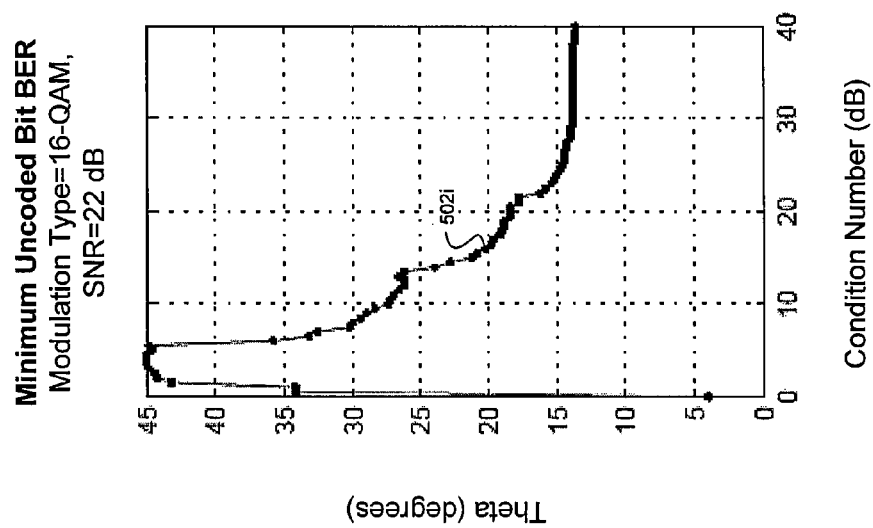
FIG. 5I presents a graph of exemplary rotation angle values computed based on a BER criterion as a function of the condition number and SNR=22 dB for 16-QAM, in accordance with an embodiment of the invention.
Figure 5J:
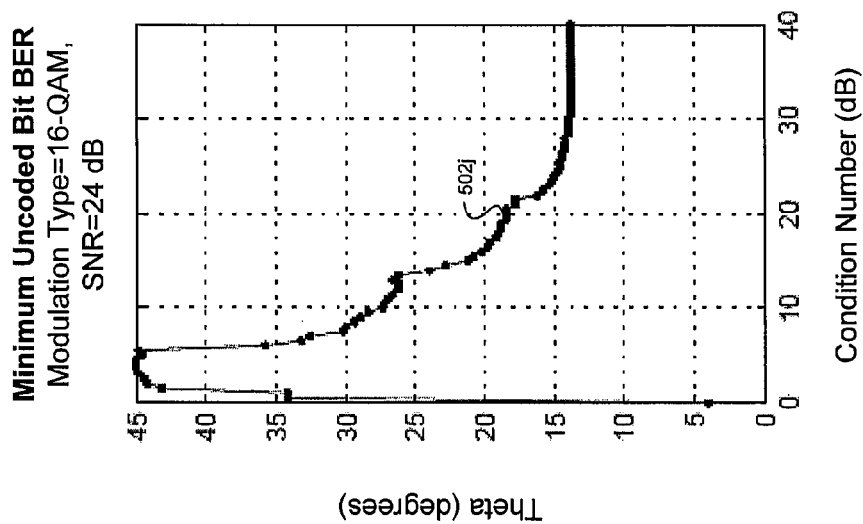
FIG. 5J presents a graph of exemplary rotation angle values computed based on a BER criterion as a function of the condition number and SNR=24 dB for 16-QAM, in accordance with an embodiment of the invention.

FIGS. 5A-5J present rotation angle values for minimum uncoded bit BER criterion based on condition number and SNR for 16-QAM. FIG. 5A presents a graph 502a of exemplary rotation angle values computed based on a BER criterion as a function of the condition number and SNR=6 dB for 16-QAM, in accordance with an embodiment of the invention. FIG. 5B presents a graph 502b of exemplary rotation angle values computed based on a BER criterion as a function of the condition number and SNR=8 dB for 16-QAM, in accordance with an embodiment of the invention. FIG. 5C presents a graph 502c of exemplary rotation angle values computed based on a BER criterion as a function of the condition number and SNR=10 dB for 16-QAM, in accordance with an embodiment of the invention. FIG. 5D presents a graph 502d of exemplary rotation angle values computed based on a BER criterion as a function of the condition number and SNR=12 dB for 16-QAM, in accordance with an embodiment of the invention. FIG. 5E presents a graph 502e of exemplary rotation angle values computed based on a BER criterion as a function of the condition number and SNR=14 dB for 16-QAM, in accordance with an embodiment of the invention. FIG. 5F presents a graph 502f of exemplary rotation angle values computed based on a BER criterion as a function of the condition number and SNR=16 dB for 16-QAM, in accordance with an embodiment of the invention. FIG. 5G presents a graph 502g of exemplary rotation angle values computed based on a BER criterion as a function of the condition number and SNR=18 dB for 16-QAM, in accordance with an embodiment of the invention. FIG. 5H presents a graph 502h of exemplary rotation angle values computed based on a BER criterion as a function of the condition number and SNR=20 dB for 16-QAM, in accordance with an embodiment of the invention. FIG. 5I presents a graph 502i of exemplary rotation angle values computed based on a BER criterion as a function of the condition number and SNR=22 dB for 16-QAM, in accordance with an embodiment of the invention. FIG. 5J presents a graph 502j of exemplary rotation angle values computed based on a BER criterion as a function of the condition number and SNR=24 dB for 16-QAM, in accordance with an embodiment of the invention.

Figure 6A:
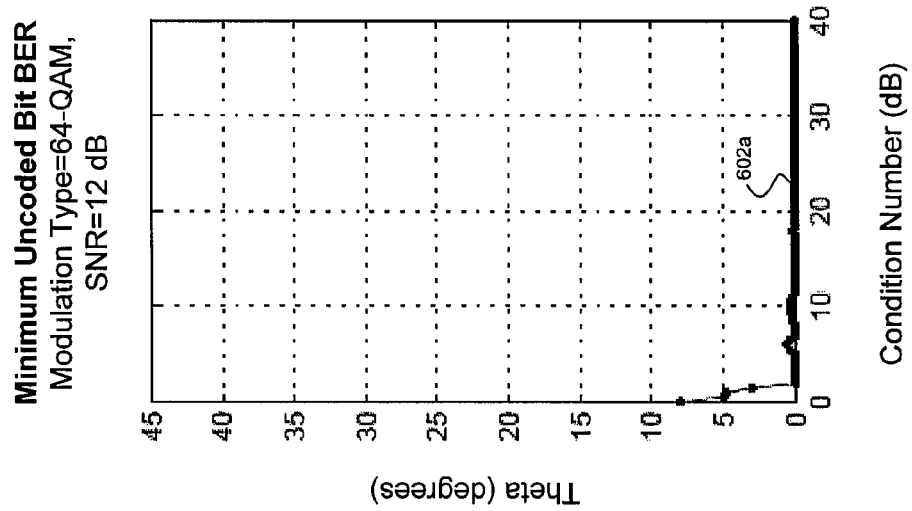
FIG. 6A presents a graph of exemplary rotation angle values computed based on a BER criterion as a function of the condition number and SNR=12 dB for 64-QAM, in accordance with an embodiment of the invention.
Figure 6B:
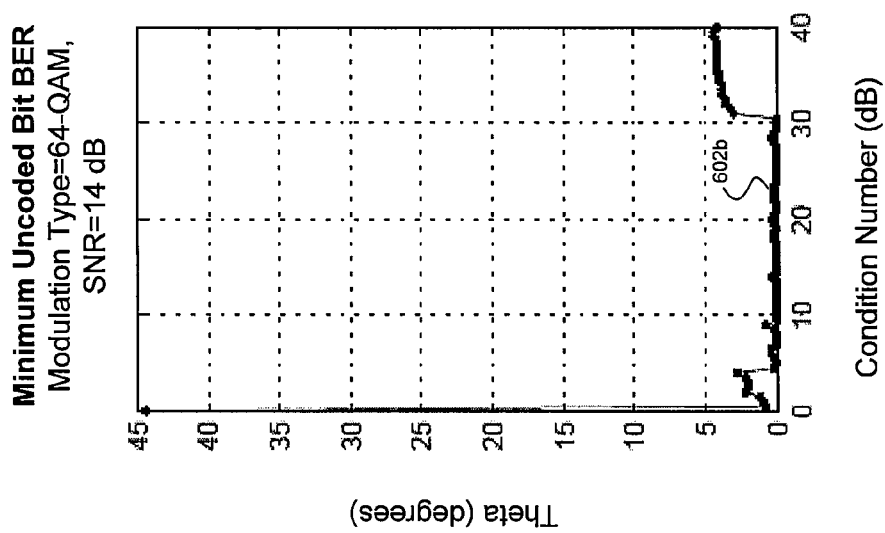
FIG. 6B presents a graph of exemplary rotation angle values computed based on a BER criterion as a function of the condition number and SNR=14 dB for 64-QAM, in accordance with an embodiment of the invention.
Figure 6C:
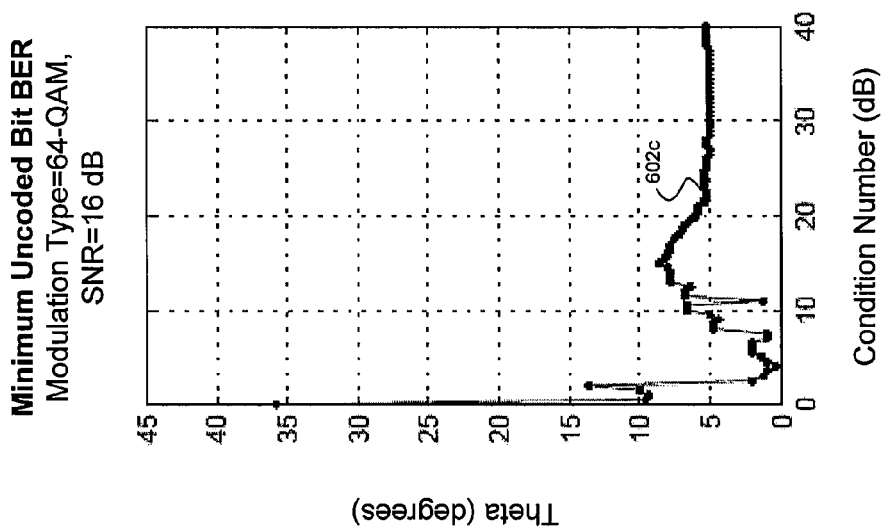
FIG. 6C presents a graph of exemplary rotation angle values computed based on a BER criterion as a function of the condition number and SNR=16 dB for 64-QAM, in accordance with an embodiment of the invention.
Figure 6D:
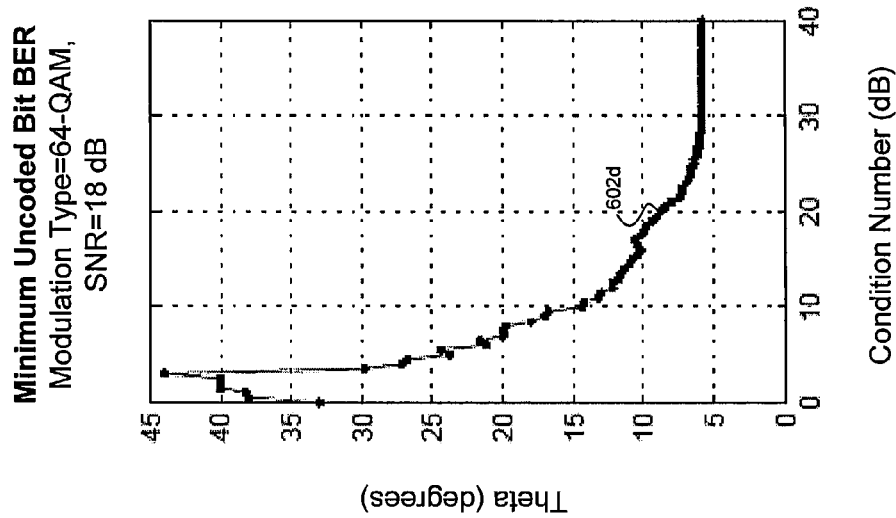
FIG. 6D presents a graph of exemplary rotation angle values computed based on a BER criterion as a function of the condition number and SNR=18 dB for 64-QAM, in accordance with an embodiment of the invention.
Figure 6E:
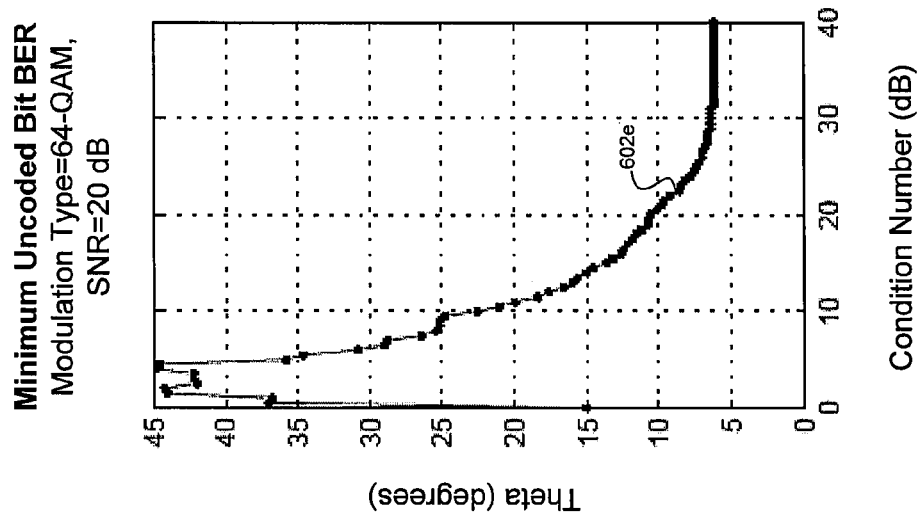
FIG. 6E presents a graph of exemplary rotation angle values computed based on a BER criterion as a function of the condition number and SNR=20 dB for 64-QAM, in accordance with an embodiment of the invention.
Figure 6F:
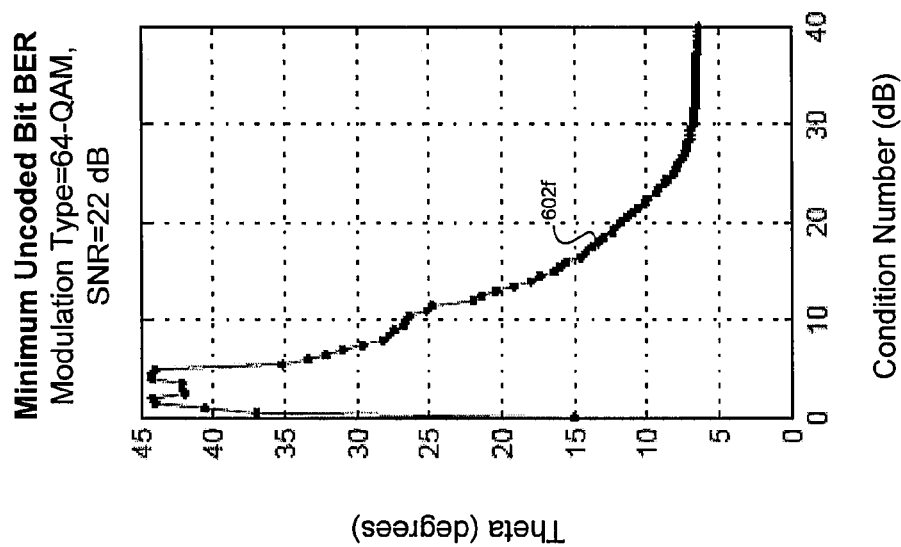
FIG. 6F presents a graph of exemplary rotation angle values computed based on a BER criterion as a function of the condition number and SNR=22 dB for 64-QAM, in accordance with an embodiment of the invention.
Figure 6G:
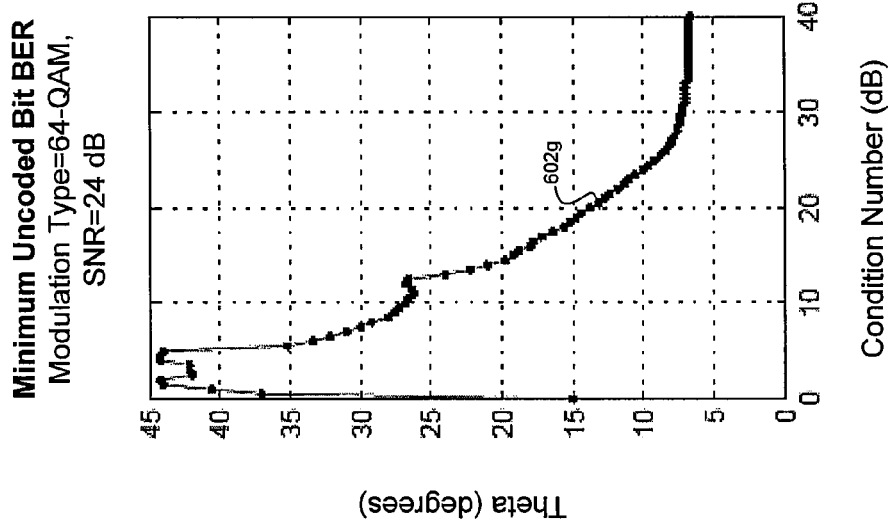
FIG. 6G presents a graph of exemplary rotation angle values computed based on a BER criterion as a function of the condition number and SNR=24 dB for 64-QAM, in accordance with an embodiment of the invention.
Figure 6H:
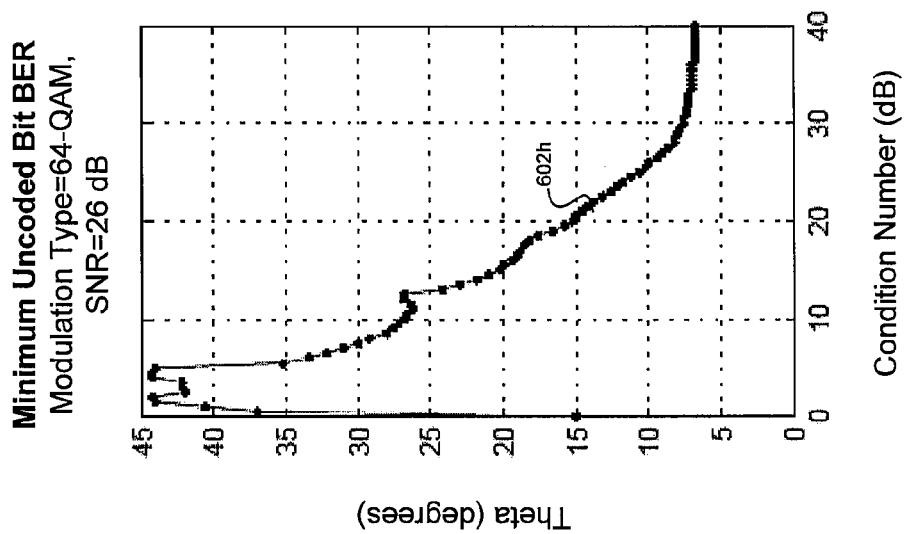
FIG. 6H presents a graph of exemplary rotation angle values computed based on a BER criterion as a function of the condition number and SNR=26 dB for 64-QAM, in accordance with an embodiment of the invention.
Figure 61:
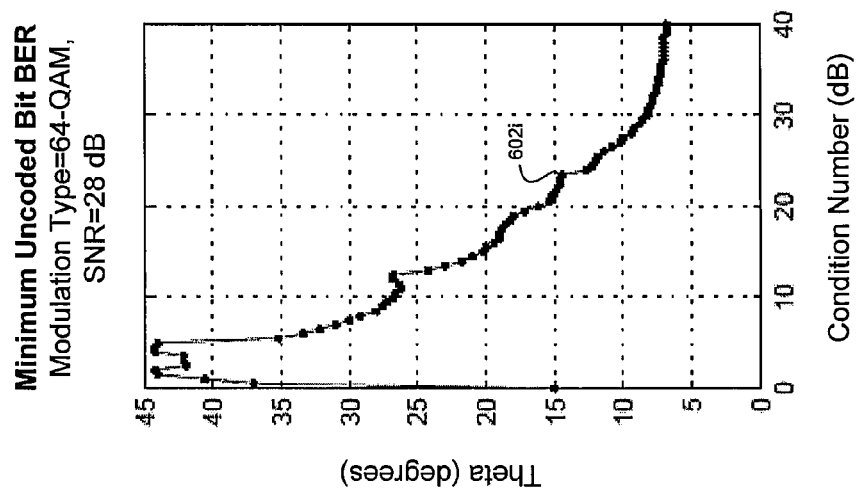
Figure 6J:
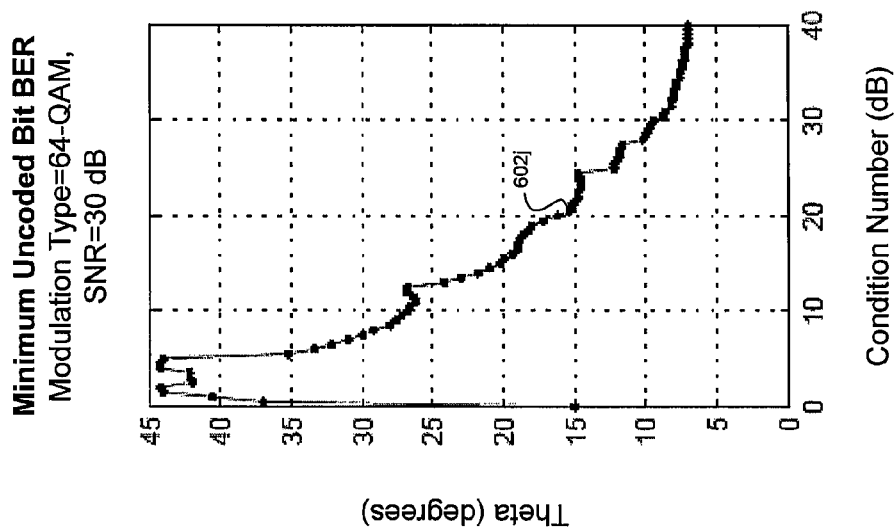
FIG. 6J presents a graph of exemplary rotation angle values computed based on a BER criterion as a function of the condition number and SNR=30 dB for 64-QAM, in accordance with an embodiment of the invention.

FIGS. 6A-6J presents rotation angle values for minimum uncoded bit BER criterion based on condition number and SNR for 64-QAM. FIG. 6A presents a graph 602a of exemplary rotation angle values computed based on a BER criterion as a function of the condition number and SNR=12 dB for 64-QAM, in accordance with an embodiment of the invention. FIG. 6B presents a graph 602b of exemplary rotation angle values computed based on a BER criterion as a function of the condition number and SNR=14 dB for 64-QAM, in accordance with an embodiment of the invention. FIG. 6C presents a graph 602c of exemplary rotation angle values computed based on a BER criterion as a function of the condition number and SNR=16 dB for 64-QAM, in accordance with an embodiment of the invention. FIG. 6D presents a graph 602d of exemplary rotation angle values computed based on a BER criterion as a function of the condition number and SNR=18 dB for 64-QAM, in accordance with an embodiment of the invention. FIG. 6E presents a graph 602e of exemplary rotation angle values computed based on a BER criterion as a function of the condition number and SNR=20 dB for 64-QAM, in accordance with an embodiment of the invention. FIG. 6F presents a graph 602f of exemplary rotation angle values computed based on a BER criterion as a function of the condition number and SNR=22 dB for 64-QAM, in accordance with an embodiment of the invention. FIG. 6G presents a graph 602g of exemplary rotation angle values computed based on a BER criterion as a function of the condition number and SNR=24 dB for 64-QAM, in accordance with an embodiment of the invention. FIG. 6H presents a graph 602h of exemplary rotation angle values computed based on a BER criterion as a function of the condition number and SNR=26 dB for 64-QAM, in accordance with an embodiment of the invention. FIG. 6I presents a graph 602i of exemplary rotation angle values computed based on a BER criterion as a function of the condition number and SNR=28 dB for 64-QAM, in accordance with an embodiment of the invention. FIG. 6J presents a graph 602j of exemplary rotation angle values computed based on a BER criterion as a function of the condition number and SNR=30 dB for 64-QAM, in accordance with an embodiment of the invention.

Figure 7:
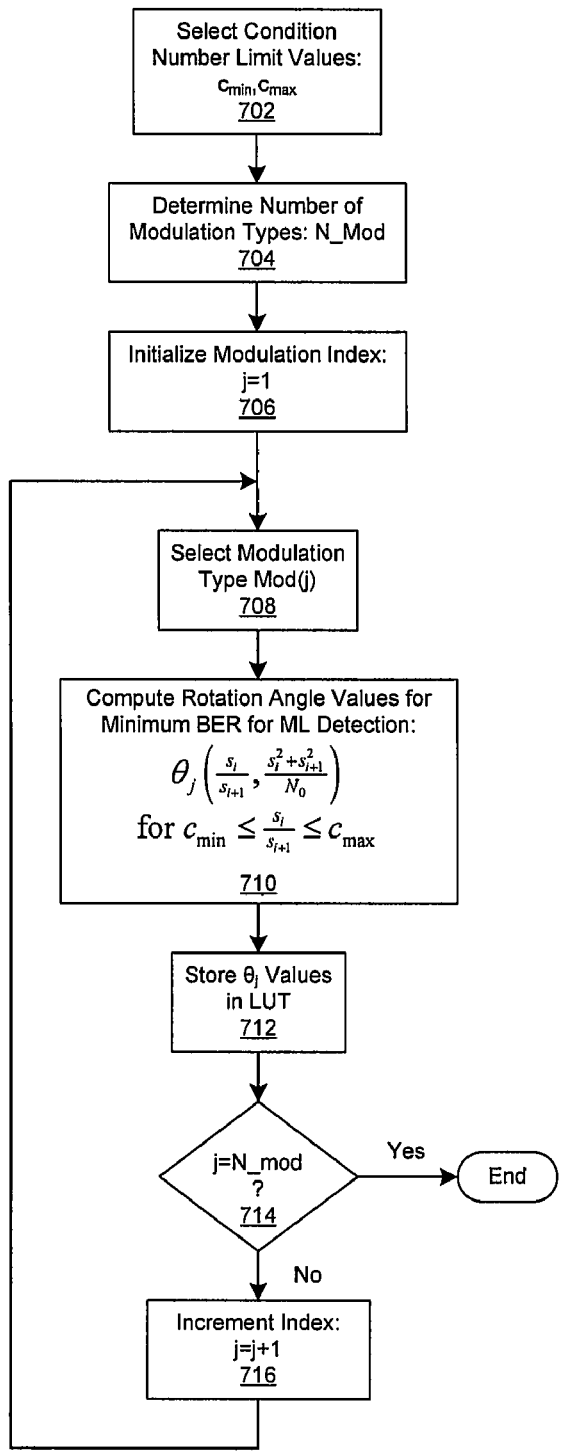
FIG. 7 is a flowchart of exemplary steps for lookup table (LUT) generation for minimum BER for ML detection, in accordance with an embodiment of the invention.

FIG. 7 is a flowchart of exemplary steps for lookup table (LUT) generation for minimum BER for ML detection, in accordance with an embodiment of the invention. Referring to FIG. 7, in step 702, minimum and maximum condition number values ($c_{min}, c_{max}$) for rotation angle computation may be determined. In step 704, the number of modulation types (N_Mod) may be determined. In step 706, a modulation index (j) may be initialized (j=1). In step 708, a current modulation type (Mod(j)) may be selected based on the current modulation index value j. In step 710, a set of rotation angle values ($\theta_j$) may be computed for the current modulation type (Mod(j)) for condition number values across the range of condition number values from $c_{min}$ to $c_{max}$. The criterion for rotation angle computation at a MIMO transmitter is to select rotation angles, which may enable a minimum BER ML detection at a MIMO receiver. The computed rotation angle values $\theta_j$ may be computed as a function of the condition number value and an SNR value. In step 712, the set of rotation angle values $\theta_j$ computed in step 710 may be stored in an LUT. The locations at which the rotation angle values is stored in the LUT may be indexed based on the modulation index value j.

In instances when j=N_mod, step 714 may determine that the current modulation type is the last modulation type for which rotation angle values is to be computed for the LUT, in which case the rotation angle computation may end. In instance where j≠N_mod at step 714, in step 716, the modulation index value may be incremented. Step 708 may follow step 716 where the next modulation type may be selected.

Figure 8:
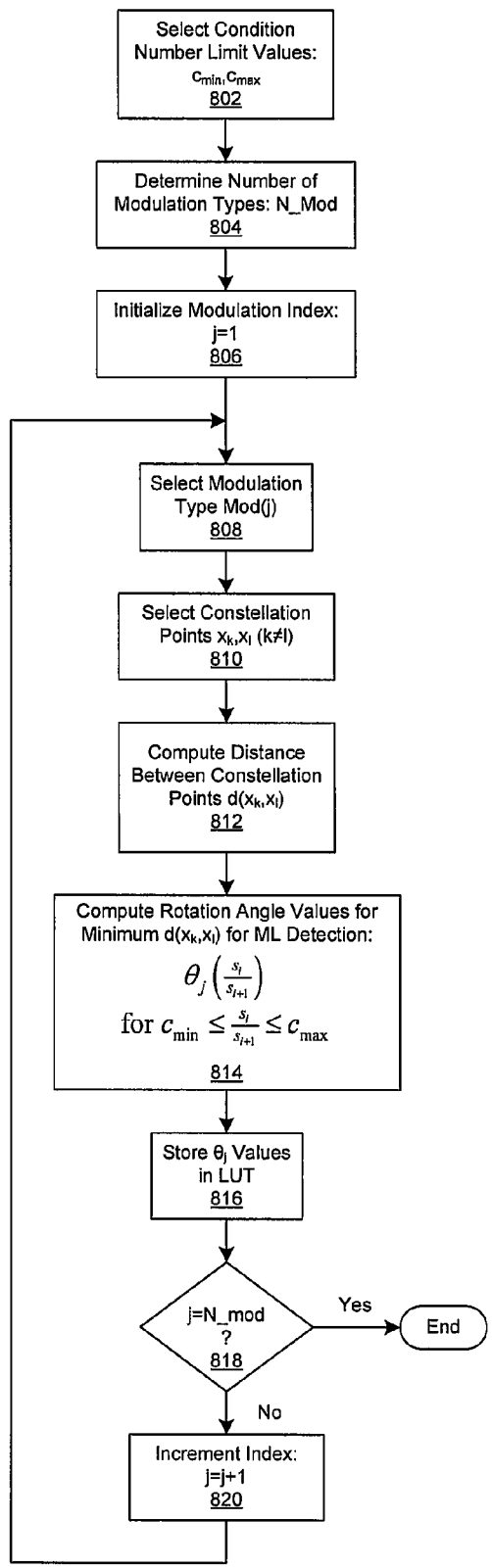
FIG. 8 is a flowchart of exemplary steps for lookup table (LUT) generation for minimum Euclidean distance for ML detection, in accordance with an embodiment of the invention.

FIG. 8 is a flowchart of exemplary steps for lookup table (LUT) generation for minimum Euclidean distance for ML detection, in accordance with an embodiment of the invention. Referring to FIG. 8, in step 802, minimum and maximum condition number values ($c_{min}, c_{max}$) for rotation angle computation may be determined. In step 804, the number of modulation types (N_Mod) may be determined. In step 806, a modulation index (j) may be initialized (j=1). In step 808, a current modulation type (Mod(j)) may be selected based on the current modulation index value j. In step 810, constellation points $x_k$ and $x_l$ may be selected from the constellation map for modulation type Mod(j). In step 812, the Euclidean distance between the constellation points $d(x_k, x_l)$ may be computed. In step 814, a set of rotation angle values ($\theta_j$) may be computed for the current modulation type (Mod(j)) for condition number values across the range of condition number values from $c_{min}$ to $c_{max}$. The criterion for rotation angle computation at a MIMO transmitter is to select rotation angles, which may maximize the minimum Euclidean distance $d(x_k, x_l)$. The computed rotation angle values $\theta_j$ may be computed as a function of the condition number value. In step 816, the set of rotation angle values $\theta_j$ computed in step 814 may be stored in an LUT. The locations at which the rotation angle values is stored in the LUT may be indexed based on the modulation index value j.

In instances when j=N_mod, step 818 may determine that the current modulation type is the last modulation type for which rotation angle values is to be computed for the LUT, in which case the rotation angle computation may end. In instance where j≠N_mod at step 818, in step 820, the modulation index value may be incremented. Step 808 may follow step 820 where the next modulation type may be selected.

Figure 9:
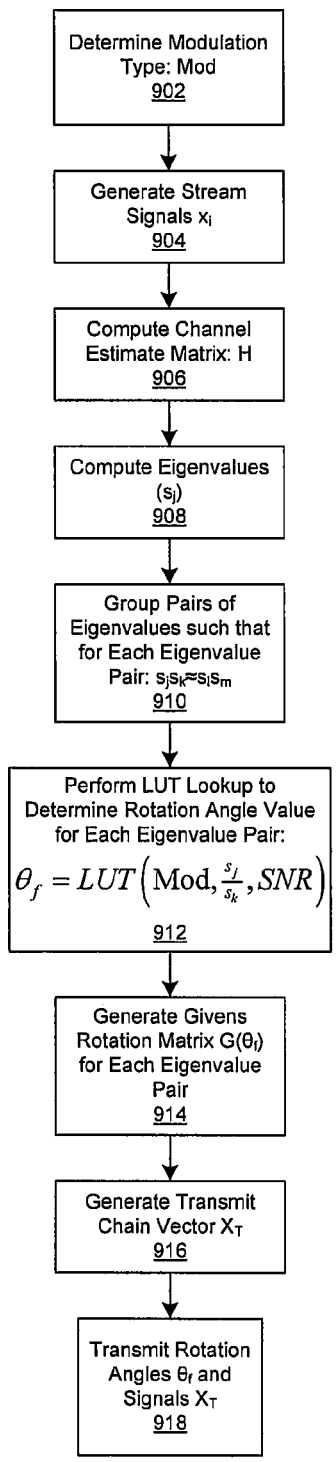
FIG. 9 is a flowchart of exemplary steps for subspace beamforming for near capacity MIMO performance, in accordance with an embodiment of the invention.

FIG. 9 is a flowchart of exemplary steps for subspace beamforming for near capacity MIMO performance, in accordance with an embodiment of the invention. Referring to FIG. 9, in step 902, a modulation type (Mod) may be determined. The modulation type may be utilized to enable the generation of symbol values in spatial streams. In step 904, a plurality of spatial stream signals ($x_i$) may be generated. The plurality of spatial stream vectors may be represented by a vector (X). In step 906, a channel estimate matrix (H) may be computed. The channel estimate matrix may characterize the communication medium into which the MIMO transmitter may transmit signals. In step 908, a plurality of eigenvalues ($s_j$) may be computed based on the matrix H. In step 910, pairs of eigenvalues may be groups such that for each such eigenvector pair $s_j s_k \approx s_l s_m$. In step 912, rotation angles $\theta_f$ may be determined for each eigenvalue pair by LUT lookup (where f represents an index for an eigenvalue pair). The referenced address within the LUT may be determined based on the modulation type (Mod) and based on the ratio of eigenvalues in the eigenvalue pair (the condition number). In instances when the rotation angle values were generated based on a minimum BER criterion, the LUT reference address may also be determined based on an SNR value (which may be determined based on the eigenvalues and on estimated noise power). In step 914, a Givens rotation matrix $G(\theta_f)$ may be generated for each eigenvalue pair (as shown in equations [15]). In step 916, a plurality of transmit chain signals ($tx_i$) may be generated based on the Givens rotation matrix (as shown in equation [7]). The plurality of transmit chain signals may be represented by a vector $X_T$. In step 918, a MIMO transmitter may transmit the rotation angles $\theta_f$ and signal vector $X_T$. The rotation angles $\theta_f$ may enable the MIMO transmitter to transmit the signal vector $X_T$ via a wireless communication medium at data communication rates (as measured in bits per second), which approach the Shannon limit for an RF channel.

In various embodiments of the invention, subspace beamforming for near capacity MIMO performance is not limited to MIMO systems, which utilize singular value decomposition (SVD). Various embodiments of the invention may also be practiced in MIMO systems, which utilize other matrix decomposition methods such as geometric mean decomposition (GMD), for example.

Aspects of a system for subspace beamforming for near capacity MIMO performance may include a MIMO transmitter 102 that computes one or more rotation angle values ($\theta_f$) based on a channel estimate matrix (H). In instances when each rotation angle is computed based on a Euclidean distance criterion, each value $\theta_f$ may also be computed based on a computed Euclidean distance. Alternatively, in instances when each rotation angle is computed based on a bit error rate (BER) criterion, each value $\theta_f$ may also be computed based on a signal noise power level ($N_0$). A plurality of spatial stream signals ($x_i$) may be generated utilizing one or more constellation types. The constellation map for each constellation type may be rotated based on a corresponding value $\theta_f$. A plurality of transmit chain signals ($tx_i$) may be generated based on the signals $x_i$ and transmitted via a communication medium characterized by the matrix H. A plurality of eigenvalues ($s_j$) may be computed based on the matrix H. Pairs of eigenvalues ($s_j$ and $s_k$) may be grouped such that the multiplicative product for each eigenvalue pair is approximately equal.

When each rotation angle value is computed based on a Euclidean distance criterion, a pair of spatial stream signals ($x_i$ and $x_l$), corresponding to each eigenvalue pair, may be identified. The Euclidean distance value may be computed based on the constellation map for the identified pair of spatial streams signals $x_i$ and $x_l$.

When each rotation angle value is computed based on a BER criterion, each rotation angle may be computed based on the ratio $$\frac{s_j}{s_k}$$

(from which a condition number may be computed) and on the ratio $$\frac{s_j^2 + s_k^2}{N_0}$$

(from which a signal to noise ratio (SNR) may be computed). A value for $N_0$ may be estimated based on the communication medium. Each value $\theta_f$ may be determined based on an estimated BER for reception at a MIMO receiver 106 of the transmitted signals $tx_i$. Each of the received signals may be represented by $y_i$. The estimated BER may be computed based on maximum likelihood (ML) detection at the MIMO receiver 106.

The computed values $\theta_f$ may be retrieved from a lookup table (LUT). The address at which a selected value $\theta_f$ is located may be determined based on a modulation type utilized for generating one or more spatial stream signals $x_i$. When each value $\theta_f$ is computed based on a Euclidean distance criterion, the LUT address may also be determined based on a condition number. The condition number may be computed based on the eigenvalues that correspond to an identified pair of spatial stream signals. When each value $\theta_f$ is computed based on a BER criterion, the LUT address may be determined based on the condition number and on an SNR value. The SNR value may be computed based on the eigenvalues and on $N_0$.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for subspace beamforming for near capacity multiple input multiple output (MIMO) performance Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing signals in a communication system, the system comprising:
a transmitter comprising one or more circuits;
said one or more circuits being configured to compute a plurality of eigenvalues based on a channel estimate matrix;
said one or more circuits being configured to compute one or more rotation angle values based on said plurality of eigenvalues and one or both of: one or more computed Euclidean distance values and a signal noise power level;
said one or more circuits being configured to generate a plurality of spatial stream signals by utilizing one or more constellation types, wherein each constellation map for said one or more constellation types is rotated based on a corresponding one of said computed one or more rotation angle values; and
said one or more circuits being configured to transmit a plurality of transmit chain signals based on said generated plurality of spatial stream signals via a communication medium that is characterized by said channel estimate matrix.

2. The system according to claim 1, said one or more circuits enable grouping of pairs of individual eigenvalues selected from said plurality of eigenvalues such that a multiplicative product of each said grouped pair of said individual eigenvalues is approximately equal.

3. The system according to claim 2, said one or more circuits enable identification of a pair spatial stream signals selected from said plurality of spatial stream signals corresponding to said each said grouped pair of said individual eigenvalues.

4. The system according to claim 3, said one or more circuits enable computation of said Euclidean distance value based on said constellation map for each spatial stream signal in said identified pair of spatial stream signals.

5. The system according to claim 2, said one or more circuits enable computation of each of said one or more rotation angle values based on a ratio of said individual eigenvalues in a corresponding one of said grouped pairs.

6. The system according to claim 5, said one or more circuits enable computation of said each of said one or more rotation angle values based on a ratio of a sum of squared values for said individual eigenvalues in said corresponding one of said grouped pairs and a value for said signal noise power level.

7. The system according to claim 6, said one or more circuits enable estimation of said value for said signal noise power level based on said communication medium.

8. The system according to claim 6, said one or more circuits enable determination of said each of said one or more rotation angle values based on an estimated bit error rate for reception of said transmitted plurality of transmit chain signals.

9. The system according to claim 1, said one or more circuits enable retrieval of said corresponding one of said computed one or more rotation angle values from a lookup table based on said utilized one or more modulation types and one or both of: a condition number and a signal to noise ratio.

10. The system according to claim 9, wherein said condition number is computed based on a ratio of eigenvalues.

11. The system according to claim 10, wherein said signal to noise ratio is computed based on a ratio of a sum of squared values for said eigenvalues and a value for said signal noise power level.

12. A method for processing signals in a communication system, the method comprising:
in a transmitter:
computing a plurality of eigenvalues based on a channel estimate matrix;
computing one or more rotation angle values based on said plurality of eigenvalues and one or both of: one or more computed Euclidean distance values and a signal noise power level;
generating a plurality of spatial stream signals by utilizing one or more constellation types, wherein each constellation map for said one or more constellation types is rotated based on a corresponding one of said computed one or more rotation angle values; and
transmitting a plurality of transmit chain signals based on said generated plurality of spatial stream signals via a communication medium that is characterized by said channel estimate matrix.

13. The method according to claim 12, comprising grouping pairs of individual eigenvalues selected from said plurality of eigenvalues such that a multiplicative product of each said grouped pair of said individual eigenvalues is approximately equal.

14. The method according to claim 13, comprising identifying a pair spatial stream signals selected from said plurality of spatial stream signals corresponding to said each said grouped pair of said individual eigenvalues.

15. The method according to claim 14, comprising computing said Euclidean distance value based on said constellation map for each spatial stream signal in said identified pair of spatial stream signals.

16. The method according to claim 13, comprising computing each of said one or more rotation angle values based on a ratio of a said individual eigenvalues in a corresponding one of said grouped pairs.

17. The method according to claim 16, comprising computing said each of said one or more rotation angle values based on a ratio of a sum of squared values for said individual eigenvalues in said corresponding one of said grouped pairs and a value for said signal noise power level.

18. The method according to claim 17, comprising estimating said value for said signal noise power level based on said communication medium.

19. The method according to claim 17, comprising determining said each of said one or more rotation angle values based on an estimated bit error rate for reception of said transmitted plurality of transmit chain signals.

20. The method according to claim 19, comprising computing said estimated bit error rate for said reception based on a maximum likelihood detector.

21. The method according to claim 12, comprising retrieving said corresponding one of said computed one or more rotation angle values from a lookup table based on said utilized one or more modulation types and one or both of: a condition number and a signal to noise ratio.

22. The method according to claim 21, wherein said condition number is computed based on a ratio of eigenvalues.

23. The method according to claim 22, wherein said signal to noise ratio is computed based on a ratio of a sum of squared values for said eigenvalues and a value for said signal noise power level.

24. A system for processing signals in a communication system, the system comprising:

a transmitting device for use in a multiple-input-multiple-output (MIMO) wireless system, said transmitting device being configured to:

compute a plurality of eigenvalues based on a channel estimate matrix;

compute one or more rotation angle values based on said plurality of eigenvalues and based on one or both of computed Euclidean distance values and computed signal noise power levels;

generate a plurality of spatial stream signals based on said computed rotation angle values and one or more constellation types, wherein said computed Euclidean distance values and said computed signal noise power levels are based a size of a constellation map for said one or more constellation types; and transmit a plurality of transmit chain signals based on said generated plurality of spatial stream signals via a communication medium that is characterized by said channel estimate matrix.

* * * * *

UNITED STATES PATENT AND TRADEMARK OFFICE
CERTIFICATE OF CORRECTION

PATENT NO. : 8,233,557 B2
APPLICATION NO. : 12/246206
DATED : July 31, 2012
INVENTOR(S) : Ariyavisitakul et al.

It is certified that error appears in the above-identified patent and that said Letters Patent is hereby corrected as shown below:

In the Specification

Column 10, Line 13
Please replace " $R=S_R G(\theta)X+U_H N$ " with -- $R=S_R G(\theta)X+U^H N$ --.

Signed and Sealed this
Thirtieth Day of July, 2013

Teresa Stanek Rea
*Acting Director of the United States Patent and Trademark Office*